US011743909B2

(12) United States Patent
Ang et al.

(10) Patent No.: US 11,743,909 B2
(45) Date of Patent: Aug. 29, 2023

(54) SYNCHRONIZED SCHEDULING FOR CARRIER AGGREGATION

(71) Applicant: Qualcomm Incorporated, San Diego, CA (US)

(72) Inventors: Peter Pui Lok Ang, San Diego, CA (US); Gaojin Wu, Beijing (CN); Jafar Mohseni, San Diego, CA (US); Huilin Xu, San Diego, CA (US); Linhai He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 239 days.

(21) Appl. No.: 17/262,786

(22) PCT Filed: Aug. 20, 2019

(86) PCT No.: PCT/CN2019/101568
§ 371 (c)(1),
(2) Date: Jan. 25, 2021

(87) PCT Pub. No.: WO2020/038358
PCT Pub. Date: Feb. 27, 2020

(65) Prior Publication Data
US 2021/0314994 A1     Oct. 7, 2021

(30) Foreign Application Priority Data

Aug. 20, 2018    (WO) ................ PCT/CN2018/101278

(51) Int. Cl.
*H04W 72/23* (2023.01)
*H04L 27/26* (2006.01)
(Continued)

(52) U.S. Cl.
CPC ....... *H04W 72/23* (2023.01); *H04L 27/26025* (2021.01); *H04W 72/0446* (2013.01);
(Continued)

(58) Field of Classification Search
CPC ......... H04W 72/1289; H04W 72/0446; H04W 72/0453; H04W 72/1257; H04W 72/1263; H04L 27/26025
See application file for complete search history.

(56) References Cited

U.S. PATENT DOCUMENTS

2007/0066273 A1* 3/2007 Laroia ............... H04W 52/0235
455/343.2
2011/0044261 A1* 2/2011 Cai ....................... H04L 5/0091
370/329
(Continued)

FOREIGN PATENT DOCUMENTS

CN    104823496 A    8/2015
CN    105991249 A    10/2016
(Continued)

OTHER PUBLICATIONS

International Search Report and Written Opinion—PCT/CN2018/101278—ISA/EPO—dated May 28, 2019.
(Continued)

*Primary Examiner* — Jael M Ulysse
(74) *Attorney, Agent, or Firm* — Holland & Hart LLP; Dang M. Vo

(57) ABSTRACT

In the examples described herein, a user equipment (UE) may identify multiple carriers configured for communications with a base station, and the UE may group the carriers into one or more preferred groups for synchronized scheduling at the base station. The preferred groups of carriers for synchronized scheduling may represent a recommendation that carriers within a preferred group are to be scheduled for communications with the base station on at least partially overlapping resources to maximize power savings at the UE. The UE may transmit an indication of the preferred groups of carriers to the base station, and the base station may identify an actual group of carriers for synchronized sched-
(Continued)

uling based on the indication received from the UE. The base station may then schedule communications with the UE based on the actual group of carriers.

30 Claims, 17 Drawing Sheets

(51) Int. Cl.
*H04W 72/0446* (2023.01)
*H04W 72/0453* (2023.01)
*H04W 72/1263* (2023.01)
*H04W 72/50* (2023.01)

(52) U.S. Cl.
CPC ... *H04W 72/0453* (2013.01); *H04W 72/1263* (2013.01); *H04W 72/535* (2023.01)

(56) References Cited

U.S. PATENT DOCUMENTS

| | | | | |
|---|---|---|---|---|
| 2012/0051306 A1* | 3/2012 | Chung | H04L 5/001 | 370/329 |
| 2012/0275366 A1* | 11/2012 | Anderson | H04W 52/0219 | 370/311 |
| 2013/0028204 A1* | 1/2013 | Dinan | H04W 56/0005 | 370/329 |
| 2013/0188620 A1* | 7/2013 | Dinan | H04W 72/23 | 370/336 |
| 2014/0010215 A1* | 1/2014 | Dinan | H04L 27/2657 | 370/336 |
| 2014/0185572 A1* | 7/2014 | Dinan | H04L 5/0098 | 370/329 |
| 2015/0029964 A1* | 1/2015 | Seo | H04L 5/0053 | 370/329 |
| 2015/0031410 A1* | 1/2015 | Lim | H04W 52/146 | 455/522 |
| 2015/0264666 A1* | 9/2015 | Yi | H04W 76/27 | 370/329 |
| 2015/0312866 A1* | 10/2015 | Kakishima | H04W 52/367 | 370/328 |
| 2016/0211952 A1 | 7/2016 | Meng et al. | | |
| 2016/0219595 A1* | 7/2016 | Larsson | H04L 5/0016 | |
| 2016/0227523 A1* | 8/2016 | Desai | H04W 72/23 | |
| 2016/0242182 A1* | 8/2016 | Chen | H04B 7/061 | |
| 2016/0323842 A1* | 11/2016 | Dinan | H04L 27/2666 | |
| 2017/0041880 A1* | 2/2017 | Ouchi | H04L 5/0053 | |
| 2017/0105179 A1* | 4/2017 | Kusashima | H04W 52/367 | |
| 2017/0251461 A1* | 8/2017 | Parkvall | H04W 72/20 | |
| 2018/0098345 A1* | 4/2018 | Tiirola | H04L 5/0098 | |
| 2018/0368157 A1* | 12/2018 | Jeon | H04W 72/044 | |
| 2019/0059100 A1* | 2/2019 | Bergström | H04L 5/001 | |
| 2019/0075589 A1* | 3/2019 | Jeon | H04W 72/0453 | |

FOREIGN PATENT DOCUMENTS

| | | |
|---|---|---|
| CN | 105991260 A | 10/2016 |
| CN | 106851722 A | 6/2017 |
| CN | 107306175 A | 10/2017 |
| EP | 2475128 A1 | 7/2012 |
| WO | WO-2018118174 A1 | 6/2018 |

OTHER PUBLICATIONS

International Search Report and Written Opinion—PCT/CN2019/101568—ISA/EPO—dated Nov. 11, 2019.
Interdigial, et al., "Power Control for NR CA", 3GPP Draft, 3GPP TSG RAN WG1 Meeting 91, R1-1720559 (Revision of parts of R1-1718366) (R15 NR WI AI 762 NR CA UL PC), 3rd Generation Partnership Project (3GPP), Mobile Competence Centre, 650, Routes Des Lucioles, F-06921 Sophia-Antipolis Cedex, France, vol. RAN WG1, No. Reno, USA, Dec. 1, 2017 Nov. 17, 2017 (Nov. 17, 2017), XP051369252, pp. 1-5, Retrieved from the Internet: URL: http://www.3gpp.org/ftp/tsg%5Fran/WG1%5FRL1/TSGR1%5F91/Docs/ [retrieved on Nov. 17, 2017], Paragraph 002.
Supplementary European Search Report—EP19853227—Search Authority—The Hague—dated Apr. 26, 2022.
3GPP TS 36.211: "3rd Generation Partnership Project; Technical Specification Group Radio Access Network; Evolved Universal Terrestrial Radio Access (E-UTRA); Physical Channels and Modulation (Release 10)", V10.2.0 (Jun. 22, 2011), pp. 1-103.

* cited by examiner

SYNCHRONIZED SCHEDULING FOR CARRIER AGGREGATION

CROSS REFERENCE TO RELATED APPLICATIONS

The present application for patent claims priority to International Patent Application No. PCT/CN2019/101568 by Ang et al., entitled "SYNCHRONIZED SCHEDULING FOR CARRIER AGGREGATION," filed Aug. 20, 2019; and to International Patent Application No. PCT/CN2018/101278 by Ang et al., entitled "SYNCHRONIZED SCHEDULING FOR CARRIER AGGREGATION," filed Aug. 20, 2018, each of which is assigned to the assignee hereof and each of which is hereby incorporated by reference in its entirety.

BACKGROUND

The following relates generally to wireless communications and more specifically to synchronized scheduling for carrier aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between a UE and a base station on multiple aggregated carriers, a feature referred to as carrier aggregation. In such systems, a base station may activate a subset of the carriers or all of the carriers to adapt to traffic patterns associated with communications with a UE (e.g., to adapt to bursty traffic patterns). The base station may then schedule communications with the UE on the activated carriers. Conventional techniques at a base station for scheduling communications with a UE on multiple activated carriers may be deficient.

SUMMARY

The described techniques relate to improved methods, systems, devices, and apparatuses that support synchronized scheduling for carrier aggregation. As described herein, a user equipment (UE) may identify multiple carriers configured for communications with a base station, and the UE may group the carriers into one or more preferred groups for synchronized scheduling at a base station. The preferred groups of carriers for synchronized scheduling may represent a recommendation that carriers within a preferred group are to be scheduled for communications with the base station on at least partially overlapping resources. The UE may then transmit an indication of the preferred groups of carriers to a base station, and the base station may identify an actual group of carriers for synchronized scheduling based on the indication received from the UE. The base station may then schedule communications with the UE based on the actual group of carriers. In particular, the base station may attempt to synchronize communications with a UE on carriers in a group to maximize the opportunities for the UE to transition to a sleep mode and save power.

A method for wireless communication at a UE is described. The method may include receiving a carrier aggregation configuration message from a base station indicating a set of carriers configured for communications with the base station, grouping the set of carriers into one or more groups, wherein carriers in each of the one or more groups are to be scheduled for communications with the base station on at least partially overlapping time resources, and communicating with the base station based on the grouping.

An apparatus for wireless communication at a UE is described. The apparatus may include a processor, memory in electronic communication with the processor, and instructions stored in the memory. The instructions may be executable by the processor to cause the apparatus to receive a carrier aggregation configuration message from a base station indicating a set of carriers configured for communications with the base station, group the set of carriers into one or more groups, wherein carriers in each of the one or more groups are to be scheduled for communications with the base station on at least partially overlapping time resources, and communicate with the base station based on the grouping.

Another apparatus for wireless communication at a UE is described. The apparatus may include means for receiving a carrier aggregation configuration message from a base station indicating a set of carriers configured for communications with the base station, grouping the set of carriers into one or more groups, wherein carriers in each of the one or more groups are to be scheduled for communications with the base station on at least partially overlapping time resources, and communicating with the base station based on the grouping.

A non-transitory computer-readable medium storing code for wireless communication at a UE is described. The code may include instructions executable by a processor to receive a carrier aggregation configuration message from a base station indicating a set of carriers configured for communications with the base station, group the set of carriers into one or more groups, wherein carriers in each of the one or more groups are to be scheduled for communications with the base station on at least partially overlapping time resources, and communicate with the base station based on the grouping.

Some examples of the method, apparatuses, and non-transitory computer-readable medium described herein may further include operations, features, means, or instructions for receiving downlink control information (DCI) for carriers within a group of the one or more groups, the DCI indicating that none of the carriers within the group include downlink data for the UE in a time slot and transitioning a radio frequency chain of the UE and associated with the group to a sleep mode until at least an end of the time slot. Some examples of the method, apparatuses, and non-transitory computer-readable medium described herein may further include operations, features, means, or instructions for failing to receive DCI that schedules a transmission in a time slot on carriers within a group of the one or more groups and transitioning a radio frequency chain of the UE and associated with the group to a sleep mode until at least an end of the time slot based on failing to receive the DCI.

In some examples of the method, apparatuses, and non-transitory computer-readable medium described herein, the carrier aggregation configuration message comprises an indication of the one or more groups of the set of carriers, and the grouping is based on the indication of the one or more groups of the set of carriers. Some examples of the method, apparatuses, and non-transitory computer-readable medium described herein may further include operations, features, means, or instructions for transmitting an indication to the base station of one or more preferred groups of the plurality of carriers.

Some examples of the method, apparatuses, and non-transitory computer-readable medium described herein may further include operations, features, means, or instructions for receiving an indication of the one or more groups of the plurality of carriers, the one or more groups being determined by the base station based at least in part on the one or more preferred groups and representing actual groupings of carriers that are to be scheduled for communications with the base station on at least partially overlapping time resources. Some examples of the method, apparatuses, and non-transitory computer-readable medium described herein may further include operations, features, means, or instructions for receiving feedback from the base station indicating whether the base station successfully received the indication. In some examples of the method, apparatuses, and non-transitory computer-readable medium described herein, the indication is transmitted in radio resource control (RRC) signaling.

In some examples of the method, apparatuses, and non-transitory computer-readable medium described herein, a group of the one or more groups includes carriers associated with a same numerology. In some examples of the method, apparatuses, and non-transitory computer-readable medium described herein, a group of the one or more groups includes at least two carriers associated with different numerologies. In some examples of the method, apparatuses, and non-transitory computer-readable medium described herein, communications in a time slot on a first carrier associated with a first numerology may be scheduled based on communications scheduled in the time slot on a second carrier associated with a second numerology, the second numerology being associated with a larger time slot duration than the first numerology. Some examples of the method, apparatuses, and non-transitory computer-readable medium described herein may further include operations, features, means, or instructions for receiving DCI for carriers within a group of the one or more groups, the DCI for a carrier being within a first time slot and scheduling communications in the first time slot or in a later time slot. In some examples of the method, apparatuses, and non-transitory computer-readable medium described herein, the set of carriers may be within a same frequency band.

A method for wireless communication at a base station is described. The method may include transmitting a carrier aggregation configuration message to a UE indicating a set of carriers configured for communications with the UE, grouping the set of carriers into one or more groups, the one or more groups representing groupings of carriers that are to be scheduled for communications with the UE on at least partially overlapping time resources, and scheduling communications with the UE on the set of carriers based on the grouping.

An apparatus for wireless communication at a base station is described. The apparatus may include a processor, memory in electronic communication with the processor, and instructions stored in the memory. The instructions may be executable by the processor to cause the apparatus to transmit a carrier aggregation configuration message to a UE indicating a set of carriers configured for communications with the UE, group the set of carriers into one or more groups, the one or more groups representing groupings of carriers that are to be scheduled for communications with the UE on at least partially overlapping time resources, and schedule communications with the UE on the set of carriers based on the grouping.

Another apparatus for wireless communication at a base station is described. The apparatus may include means for transmitting a carrier aggregation configuration message to a UE indicating a set of carriers configured for communications with the UE, grouping the set of carriers into one or more groups, the one or more groups representing groupings of carriers that are to be scheduled for communications with the UE on at least partially overlapping time resources, and scheduling communications with the UE on the set of carriers based on the grouping.

A non-transitory computer-readable medium storing code for wireless communication at a base station is described. The code may include instructions executable by a processor to transmit a carrier aggregation configuration message to a UE indicating a set of carriers configured for communications with the UE, group the set of carriers into one or more groups, the one or more groups representing groupings of carriers that are to be scheduled for communications with the UE on at least partially overlapping time resources, and schedule communications with the UE on the set of carriers based on the grouping.

In some examples of the method, apparatuses, and non-transitory computer-readable medium described herein, identifying the one or more groups of the set of carriers may include operations, features, means, or instructions for receiving an indication from the UE of one or more preferred groups of the set of carriers, the one or more preferred groups representing a recommendation that carriers within a preferred group are to be scheduled for communications with the UE on at least partially overlapping resources and grouping the set of carriers into the one or more groups based on the one or more preferred groups. Some examples of the method, apparatuses, and non-transitory computer-readable medium described herein may further include operations, features, means, or instructions for transmitting feedback to the UE indicating whether the base station successfully received the indication. In some examples of the method, apparatuses, and non-transitory computer-readable medium described herein, the indication may be received in RRC signaling.

In some examples of the method, apparatuses, and non-transitory computer-readable medium described herein, scheduling communications with the UE on the set of carriers may include operations, features, means, or instructions for transmitting DCI for carriers within a group, the DCI indicating whether downlink data may be included in a time slot for the UE on a respective carrier. In some examples of the method, apparatuses, and non-transitory computer-readable medium described herein, the DCI for a carrier may be within a first time slot and schedules communications in the first time slot or in a later time slot. In some examples of the method, apparatuses, and non-transitory computer-readable medium described herein, a group of the one or more groups includes carriers associated with a same numerology.

In some examples of the method, apparatuses, and non-transitory computer-readable medium described herein, a group of the one or more groups includes at least two carriers associated with different numerologies. In some examples of the method, apparatuses, and non-transitory computer-readable medium described herein, scheduling communications with the UE on the set of carriers may include operations, features, means, or instructions for scheduling communications in a time slot on a first carrier associated with a first numerology based on communications scheduled in the time slot on a second carrier associated with a second numerology, the second numerology being associated with a larger slot duration than the first numerology. In some examples of the method, apparatuses, and non-transitory computer-readable medium described herein, the set of carriers may be within a same frequency band.

DETAILED DESCRIPTION

Figure 1:
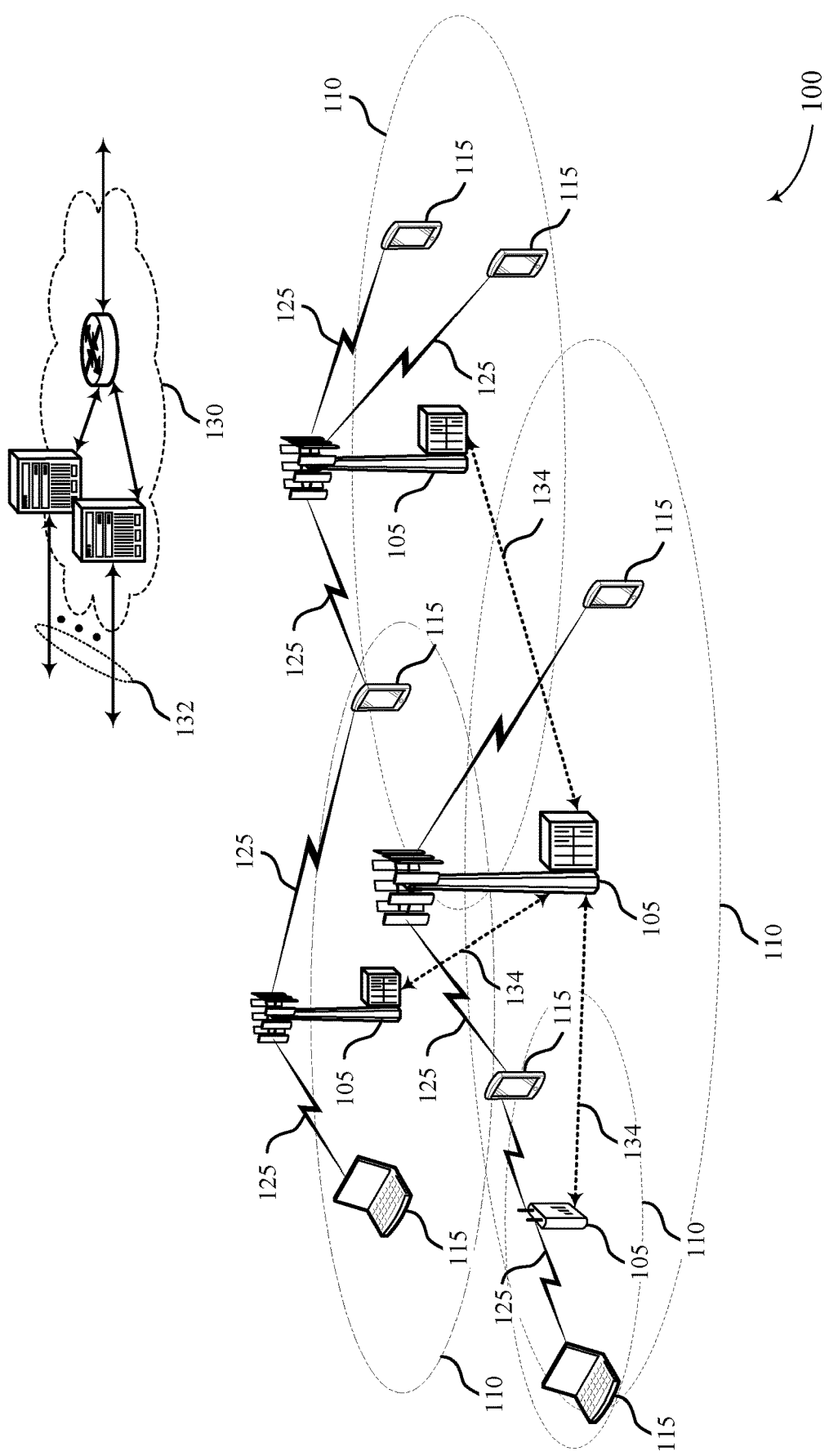
FIG. 1 illustrates an example of a wireless communications system that supports synchronized scheduling for carrier aggregation in accordance with aspects of the present disclosure.

Some wireless communications systems may support communications between a user equipment (UE) and a base station on multiple aggregated carriers, a feature referred to as carrier aggregation. The use of carrier aggregation may allow a base station to increase the bandwidth used to communicate with a UE. To provide additional flexibility, the base station may be configured to deactivate one or more carriers (e.g., secondary cells) or transition the one or more carriers to a dormant state to adapt to traffic patterns associated with communications with a UE. When a carrier is active (e.g., during active traffic burst periods), the base station may schedule communications with the UE on the carrier. In some cases, however, the base station may not be able to schedule communications with the UE on successive slots on a carrier. For instance, the base station may schedule communications with the UE in one slot, and the base station may schedule communications with another UE in a next slot. In such cases, it may be appropriate for the UE to transition a radio frequency (RF) chain to a sleep mode during slots where the UE is unscheduled.

For inter-band carrier aggregation, where different RF chains are used for communications on different carriers, a UE may be able to transition an RF chain used to communicate on a carrier to a sleep mode during slots where the UE is unscheduled on the carrier. For intra-band carrier aggregation, however, a common RF chain may be used for communications on multiple carriers, and a UE may not be able to transition the common RF chain to a sleep mode during slots where the UE is unscheduled on one of the multiple carriers if the UE is scheduled on another one of the multiple carriers. That is, the common RF chain may have to be fully active even when a single carrier of the multiple carriers is being used to communicate with a base station during a slot. Accordingly, the UE may not be able to transition the common RF chain to a sleep mode to save power unless the UE is unscheduled on all of the multiple carriers on which the RF chain is used to communicate.

As described herein, a wireless communications system may support efficient techniques for scheduling communications between a base station and a UE to maximize power savings at the UE. In particular, a base station may attempt to synchronize communications with a UE on carriers associated with a common RF chain at the UE (i.e., using synchronized scheduling). Accordingly, when the base station is able to synchronize communications, the UE may be scheduled to communicate with the base station on the multiple carriers in the same slots and the UE may be unscheduled on the multiple carriers in the same slots (i.e., to allow the UE to transition the common RF chain to a sleep mode). In some cases, the UE may transmit an indication of preferred groups of carriers for synchronized scheduling at a base station, and the base station may group carriers for synchronized scheduling based on the preferred groups of carriers indicated by the UE. In other cases, the base station may group carriers for synchronized scheduling independent of signaling from the UE, and the base station may transmit an indication of the grouping to the UE. In yet other cases, the base station and UE may group carriers based on a grouping configuration at these devices.

Aspects of the disclosure introduced above are described below in the context of a wireless communications system. Examples of processes and signaling exchanges that support synchronized scheduling for carrier aggregation are then described. Aspects of the disclosure are further illustrated by and described with reference to apparatus diagrams, system diagrams, and flowcharts that relate to synchronized scheduling for carrier aggregation.

FIG. 1 illustrates an example of a wireless communications system 100 that supports synchronized scheduling for carrier aggregation in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ feedback may include an acknowledgment (ACK) indicating that a device successfully received a transmission or a negative acknowledgment (NACK) indicating that the device failed to successfully receive the transmission. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A UE 115 in a connected mode may monitor a downlink control channel at the beginning of a slot (e.g., during an on-time when connected-mode discontinuous reception (C-DRX) is enabled) to receive downlink control information (DCI) from a base station 105. For downlink scheduling, the DCI may indicate whether downlink data is included in a remaining portion of the slot (i.e., in a data channel of the slot) after the last symbol that includes the downlink channel. If the UE 115 determines that the remaining portion of the slot is unscheduled (e.g., does not include downlink data), the UE 115 may transition an RF chain at the UE 115 into a sleep mode (e.g., micro-sleep mode), and the UE 115 may skip subsequent sample or baseband processing for the unscheduled portion of the slot. Accordingly, the UE 115 may be able to save power since the UE 115 may skip monitoring the remaining portion of the slot (i.e., the downlink channel) for downlink data from the base station 105. The duration for which the UE 115 may transition to the sleep mode may vary depending on whether the DCI scheduling a downlink transmission in a slot is received in the slot (i.e., intra-slot scheduling) or is received in a previous slot (i.e., cross-slot scheduling).

Figure 2:
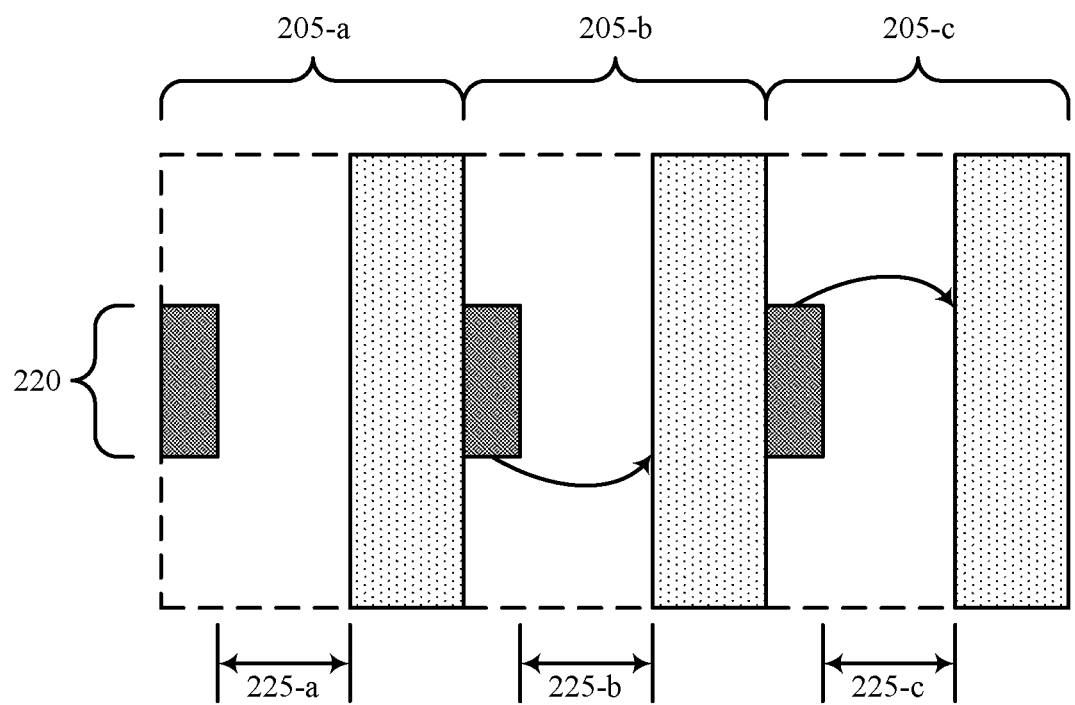
FIG. 2 illustrates an example of intra-slot scheduling in accordance with aspects of the present disclosure.

FIG. 2 illustrates an example of intra-slot scheduling 200 in accordance with aspects of the present disclosure. In the example of FIG. 2, a UE 115 may receive control information in control channels 210 in multiple slots 205 (e.g., in a control resource set (coreset) intended for the UE 115, the coreset spanning a portion of the system bandwidth 220), and the control information received in a slot 205 may indicate whether downlink data is included in a data channel 215 in that slot. In this example, for an unscheduled data transmission in a slot 205, a UE 115 may have to process control information received in a control channel 210 of the slot 205 for the duration of a time period 225 (i.e., the critical path for downlink control processing) before determining that no downlink data is scheduled in a remaining portion of the slot. For instance, the UE 115 may process control information received in a control channel 210 of the slot 205-*a* for the duration of a time period 225-*a* before determining that no downlink data is scheduled in a remaining portion of the slot 205-*a*. Accordingly, the UE 115 may not be able to transition to a sleep mode for the duration of the time period 225, and power savings at the UE 115 may be limited. In addition, for larger subcarrier spacings and shorter slot durations, the power savings at the UE 115 may be further limited since the time period 225 may be fixed (i.e., due to fixed software and hardware latency) and may overlap with a larger portion of the data channel in a slot (i.e., reducing the portion of the slot available for transitioning to a sleep mode).

Figure 3:
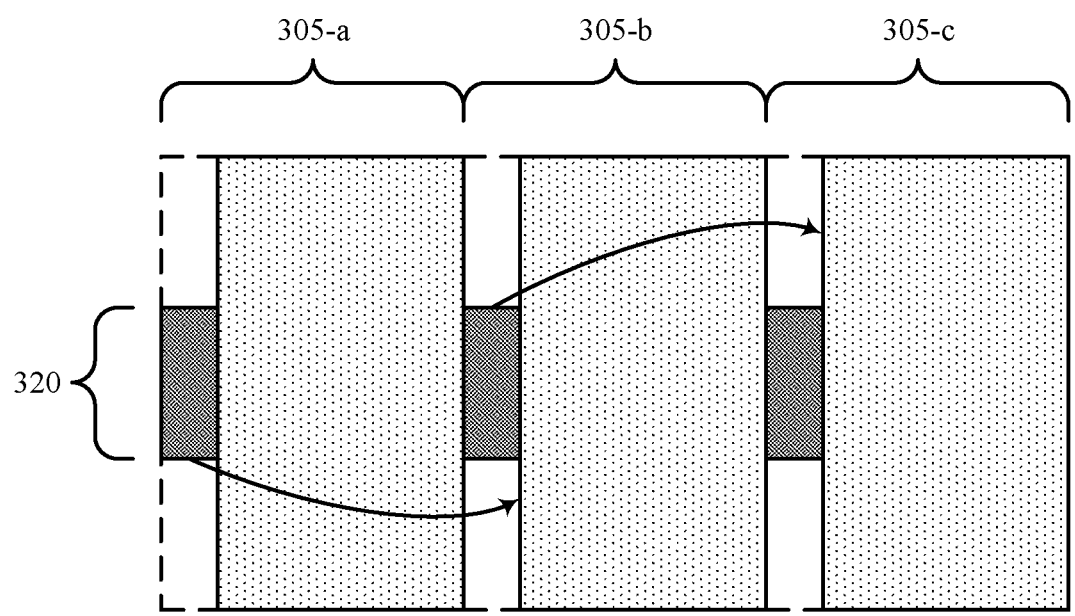
FIG. 3 illustrates an example of cross-slot scheduling in accordance with aspects of the present disclosure.

FIG. 3 illustrates an example of cross-slot scheduling 300 in accordance with aspects of the present disclosure. In the example of FIG. 3, a UE 115 may receive control information in control channels 310 in multiple slots 305 (e.g., in a coreset intended for the UE 115, the coreset spanning a portion of the system bandwidth 320), and the control information received in each slot 305 may indicate whether downlink data is included in a data channel 315 in a subsequent slot (i.e., across one slot (k0=1), two slots (k0=2), etc.). In this example, for an unscheduled data transmission in a slot 305, a UE 115 may determine that no downlink data is scheduled to be transmitted in the slot 305 prior to the slot 305 or prior to a data channel 315 in the slot 305, and the UE 115 may be able to transition to a sleep mode after receiving control information in a control channel 310 in the slot 305. For instance, for an unscheduled data transmission in a slot 305-*b*, a UE 115 may determine that no downlink data is scheduled to be transmitted in the slot 305-*b* prior to the slot 305-*b* or prior to a data channel 315 in the slot 305-*b*, and the UE 115 may be able to transition to a sleep mode after receiving control information in a control channel 310 in the slot 305-*b*. Thus, power savings at the UE 115 may be maximized.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth. Wireless communications system 100 may support communication with a UE 115 on multiple cells or carriers (e.g., each associated with a particular numerology, where the numerology of a carrier may be determined by the bandwidth part spanned by the carrier), a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers. An enhanced component carrier may be characterized by one or more features including wider carrier or frequency channel bandwidth, shorter symbol duration, shorter TTI duration, or modified control channel configuration. A shorter symbol duration may be associated with increased spacing between adjacent subcarriers. In some cases, an enhanced component carrier may be associated with a carrier aggregation configuration or a dual connectivity configuration (e.g., when multiple serving cells have a suboptimal or non-ideal backhaul link). An enhanced component carrier may also be configured for use in unlicensed spectrum or shared spectrum (e.g., where more than one operator is allowed to use the spectrum). An enhanced component carrier characterized by wide carrier bandwidth may include one or more segments that may be utilized by UEs 115 that are not capable of monitoring the whole carrier bandwidth or are otherwise configured to use a limited carrier bandwidth (e.g., to conserve power).

The use of carrier aggregation may allow a base station 105 to increase the bandwidth used to communicate with a UE 115. To provide additional flexibility, the base station 105 may be configured to deactivate one or more carriers (e.g., secondary cells) or transition the one or more carriers to a dormant state to adapt to traffic patterns associated with communications with a UE 115 (e.g., to adapt to bursty traffic patterns). When a carrier is active (e.g., during active traffic burst periods), the base station 105 may schedule communications with the UE 115 on the carrier. In some cases, however, the base station 105 may not be able to schedule communications with the UE 115 on successive slots on a carrier (i.e., some slots on the carrier may not include a grant for the UE 115). For instance, the base station 105 may schedule communications with the UE 115 on one slot, and the base station 105 may schedule communications with another UE 115 in a next slot. In such cases, it may be appropriate for the UE 115 to transition an RF chain to a sleep mode during slots where the UE 115 is unscheduled.

For inter-band carrier aggregation, where different RF chains are used for communications on different carriers, a UE 115 may be able to transition an RF chain used to communicate on a carrier to a sleep mode during slots where the UE 115 is unscheduled on the carrier. That is, the UE 115 may be able to determine when to transition an RF chain used to communicate on a carrier to a sleep mode based on its scheduling. For intra-band carrier aggregation, however, a common RF chain (or digital transceiver (DTR)) may be used for communications on multiple carriers, and a UE 115 may not be able to transition the common RF chain to a sleep mode during slots where the UE 115 is unscheduled on one of the multiple carriers and the UE 115 is scheduled on another one of the multiple carriers. That is, the common RF chain may have to be fully active even when a single carrier of the multiple carriers is being used to communicate with a base station 105 during a slot. Accordingly, the UE 115 may not be able to transition the common RF chain to a sleep mode unless the UE 115 is not scheduled to communicate on all of the multiple carriers on which the RF chain is used to communicate.

Figure 4:
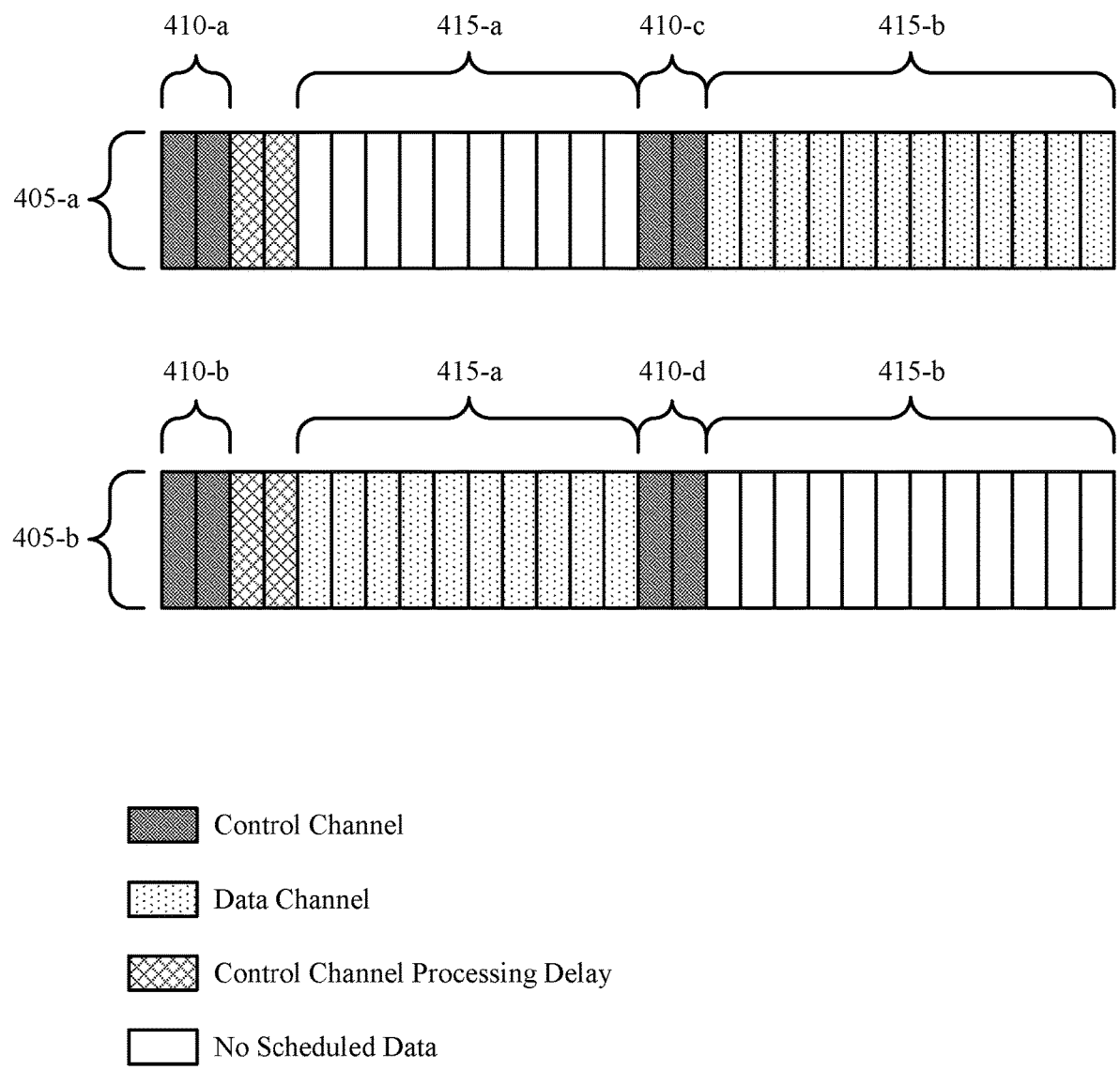
FIG. 4 illustrates an example of resources used for communications between a base station and a UE on multiple carriers for intra-band carrier aggregation in accordance with aspects of the present disclosure.

FIG. 4 illustrates an example of resources 400 used for communications between a base station 105 and a UE 115 on multiple carriers 405 for intra-band carrier aggregation in accordance with aspects of the present disclosure. In the example of FIG. 4, a base station 105 may communicate with a UE 115 using a common RF chain on a first carrier 405-a and a second carrier 405-b, where the first carrier 405-a and the second carrier 405-b may be within a same frequency band (i.e., intra-band carrier aggregation).

The UE 115 may receive an indication (e.g., in a first control channel 410-a) on the first carrier 405-a that the UE 115 is unscheduled in a set of symbols 415-a (e.g., the UE 115 may fail to receive a grant for communications in the set of symbols 415-a). However, because the UE 115 may be scheduled (e.g., based on an indication received in the second control channel 410-b) to communicate on the same set of symbols 415-a on the second carrier 405-a, the UE 115 may not be able to transition the common RF chain to a sleep mode for the duration of the set of symbols 415-a. Similarly, although the UE 115 may be unscheduled (e.g., based on an indication received in control channel 410-d) in a set of symbols 415-b on a second carrier 405-b, the UE 115 may not be able to transition the common RF chain to a sleep mode for the duration of the set of symbols 415-b since the UE 115 may be scheduled (e.g., via an indication received in control channel 410-c) to communicate on the set of symbols 415-b on the first carrier 405-a. Wireless communications system 100 may support efficient techniques for scheduling communications between a base station 105 and a UE 115 to maximize power savings at the UE 115.

Figure 5:
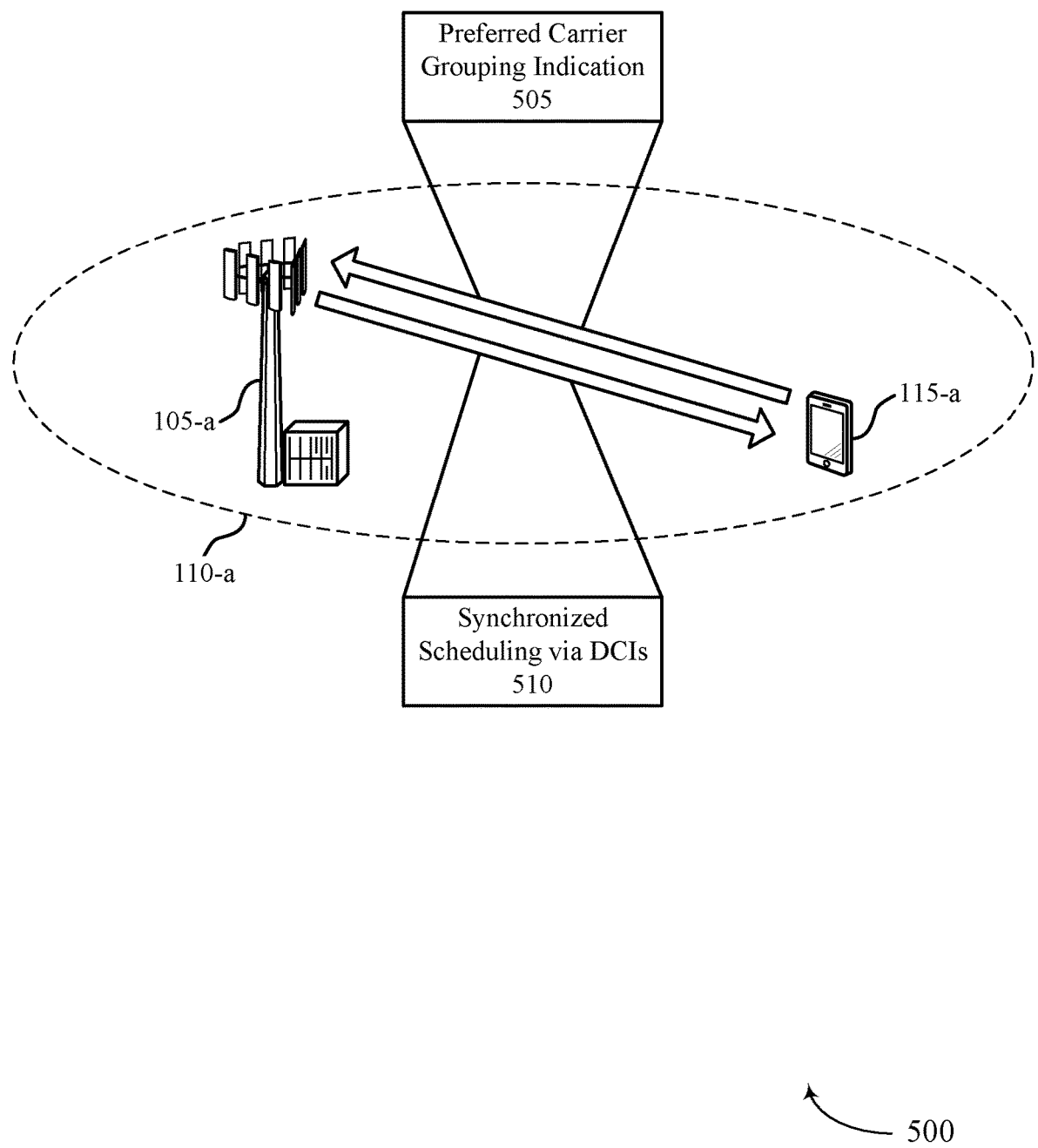
FIG. 5 illustrates an example of a wireless communications system that supports synchronized scheduling for carrier aggregation in accordance with aspects of the present disclosure.

FIG. 5 illustrates an example of a wireless communications system 500 that supports synchronized scheduling for carrier aggregation in accordance with aspects of the present disclosure. Wireless communications system 500 includes base station 105-a, which may be an example of a base station 105 described with reference to FIGS. 1-4. Wireless communications system 500 also includes UE 115-a, which may be an example of a UE 115 described with reference to FIGS. 1-4. Base station 105-a may provide communication coverage for a respective coverage area 110-a, which may be an example of a coverage area 110 described with reference to FIG. 1. Base station 105-a may communicate with UE 115-a on multiple aggregated carriers (e.g., using carrier aggregation). Wireless communications system 500 may implement aspects of wireless communications system 100. For example, wireless communications system 500 may support efficient techniques for scheduling communications between base station 105-a and UE 115-a to maximize power savings at UE 115-a. It is to be understood that the techniques described herein are applicable for both intra-slot and cross-slot scheduling.

In the example of FIG. 5, base station 105-a may transmit a carrier aggregation configuration to UE 115-a to configure UE 115-a for communications on multiple carriers. UE 115-a may then identify one or more preferred groups of carriers for synchronized scheduling at the base station 105-a, and UE 115-a may transmit an indication 505 of the preferred groups of carriers to base station 105-a (e.g., via RRC signaling). The preferred groups of carriers may each represent a recommendation of carriers to be scheduled for communications between base station 105-a and UE 115-a on overlapping time resources. For instance, each of the preferred groups of carriers may correspond to a group of carriers associated with a common RF chain at UE 115-a (i.e., the group of carriers on which the UE 115-a may communicate with a common RF chain). The scheduling of communications on carriers on overlapping time resources may be referred to as synchronized scheduling and may allow UE 115-a to transition a common RF chain used to communicate on the carriers to a sleep mode when UE 115-a is unscheduled on the carriers.

Base station 105-a may receive the indication 505 of the preferred groups of carriers for synchronized scheduling, and base station 105-a may transmit DCI 510 to UE 115-a to schedule communications based on the preferred groups of carriers. In some cases, base station 105-a may use the preferred groups indicated by UE 115-a to perform the synchronized scheduling. In other cases, however, base station 105-a may identify different (e.g., actual) groups of carriers to use to perform the synchronized scheduling. For example, if a preferred group of carriers includes carrier 0, carrier 1, and carrier 2, base station 105-a may determine that this grouping may not be feasible, and base station 105-a may identify a first group of carriers including carrier 0 and carrier 1 for synchronized scheduling and a second group of carriers including carrier 2 for synchronized scheduling. In such cases, base station 105-a may indicate the different groups of carriers (i.e., the final grouping information) to UE 115-a. Additionally, base station 105-a may transmit HARQ feedback (e.g., an ACK or NACK) indicating whether the indication 505 was successfully received.

Since base station 105-a may attempt to schedule communications on carriers associated with a common RF chain at a UE 115-a at the same time (i.e., based on the carrier groupings), it may be unlikely that the UE 115-a is scheduled to communicate on one carrier and unscheduled to communicate on another carrier. That is, it may be more likely that the UE 115-a is scheduled to communicate on the carriers associated with the common RF chain at the same time and that the UE 115-a is unscheduled to communicate on the carriers associated with the common RF chain at the same time. As a result, the UE 115-a may have more opportunities to transition the common RF chain to a sleep mode to save power, and power savings at the UE 115-a may be maximized.

Figure 6:
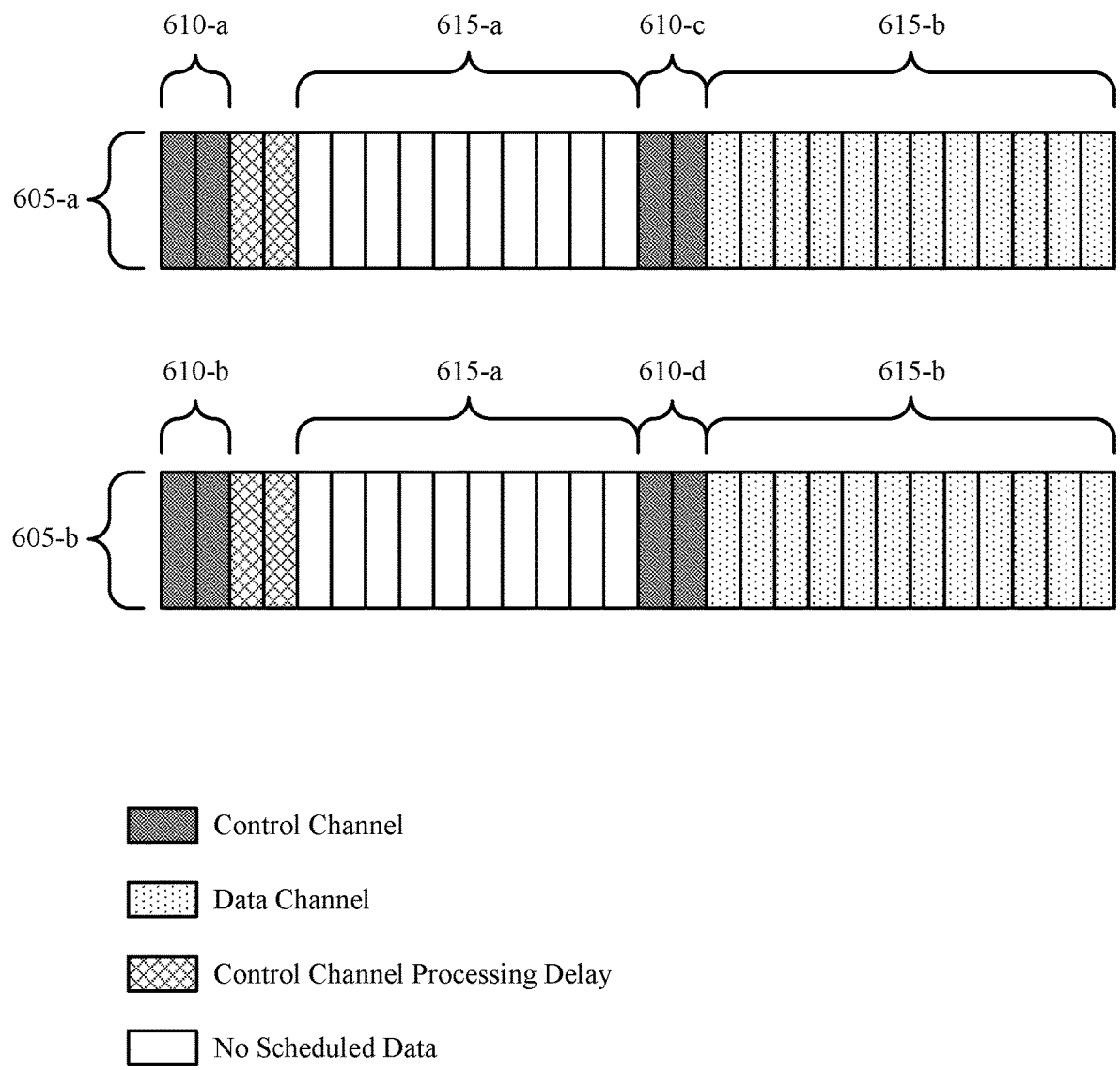
FIG. 6 illustrates an example of resources used for synchronized communications between a base station and a UE on multiple carriers associated with the same numerology in accordance with aspects of the present disclosure.

FIG. 6 illustrates an example of resources 600 used for synchronized communications between a base station 105 and a UE 115 on multiple carriers 605 associated with the same numerology in accordance with aspects of the present disclosure. In the example of FIG. 6, UE 115-a may be configured to communicate on a first carrier 605-a and a second carrier 605-b using a common RF chain, where the first carrier 605-a and the second carrier 605-b may be within a same frequency band (i.e., intra-band carrier aggregation). To maximize power savings at the UE 115-a, base station 105-a may use the techniques described herein to schedule UE 115-a for synchronized communications on the first carrier 605-a and the second carrier 605-b. That is, base station 105-a may group the first carrier 605-a and the second carrier 605-b for synchronized scheduling (e.g., based on an indication of preferred groups for synchronized scheduling received from UE 115-a).

UE 115-a may receive an indication (e.g., in a first control channel 610-a) on the first carrier 605-a that the UE 115-a is unscheduled in a set of symbols 615-a on the first carrier 605-a, and UE 115-a may receive another indication (e.g., in a second control channel 610-b) on the second carrier 605-b that the UE 115-a is also unscheduled in the set of symbols 615-a on the second carrier 605-b. Thus, UE 115-a may transition the common RF chain used to communicate on the first carrier 605-a and the second carrier 605-b to a sleep mode to save power for the duration of the set of symbols 615-*a*. UE 115-*a* may then receive an indication (e.g., in a third control channel 610-*c*) that the UE 115-*a* is scheduled to receive data in a set of symbols 615-*b* on the first carrier 605-*a*, and UE 115-*a* may receive another indication (e.g., in a fourth control channel 610-*d*) that the UE 115-*a* is scheduled to receive data in the set of symbols 615-*b* on the second carrier 605-*b*. Thus, UE 115-*a* may keep the common RF chain active to receive the data in the set of symbols 615-*b* on the first carrier 605-*a* and the second carrier 605-*b*.

In the example of FIG. 6, base station 105-*a* may be able to synchronize communications with UE 115-*a* on the first carrier 605-*a* and the second carrier 605-*b* to maximize power savings at UE 115-*a*. In other examples, however, base station 105-*a* may be unable to synchronize communications on the first carrier 605-*a* and the second carrier 605-*b*. In such examples, since UE 115-*a* may determine whether to transition a common RF chain to a sleep mode based on whether the DCI received on carriers 605-*a* and 605-*b* schedules communications on these carriers (i.e., the RF sleep decision may be based on the DCI), UE 115-*a* may be able to keep an RF chain active to communicate on one carrier even if the UE 115-*a* is not scheduled to communicate on another carrier. That is, the synchronized scheduling for UE 115-*a* may not be static. Instead, the base station 105-*a* may attempt to perform synchronized scheduling (i.e., the synchronized scheduling may be a best effort by the base station 105-*a*), and if the base station 105-*a* is unable to perform synchronized scheduling, the UE 115-*a* may still be able to adapt to communicate on one or more carriers or transition an RF chain to a sleep mode to save power.

Figure 7:
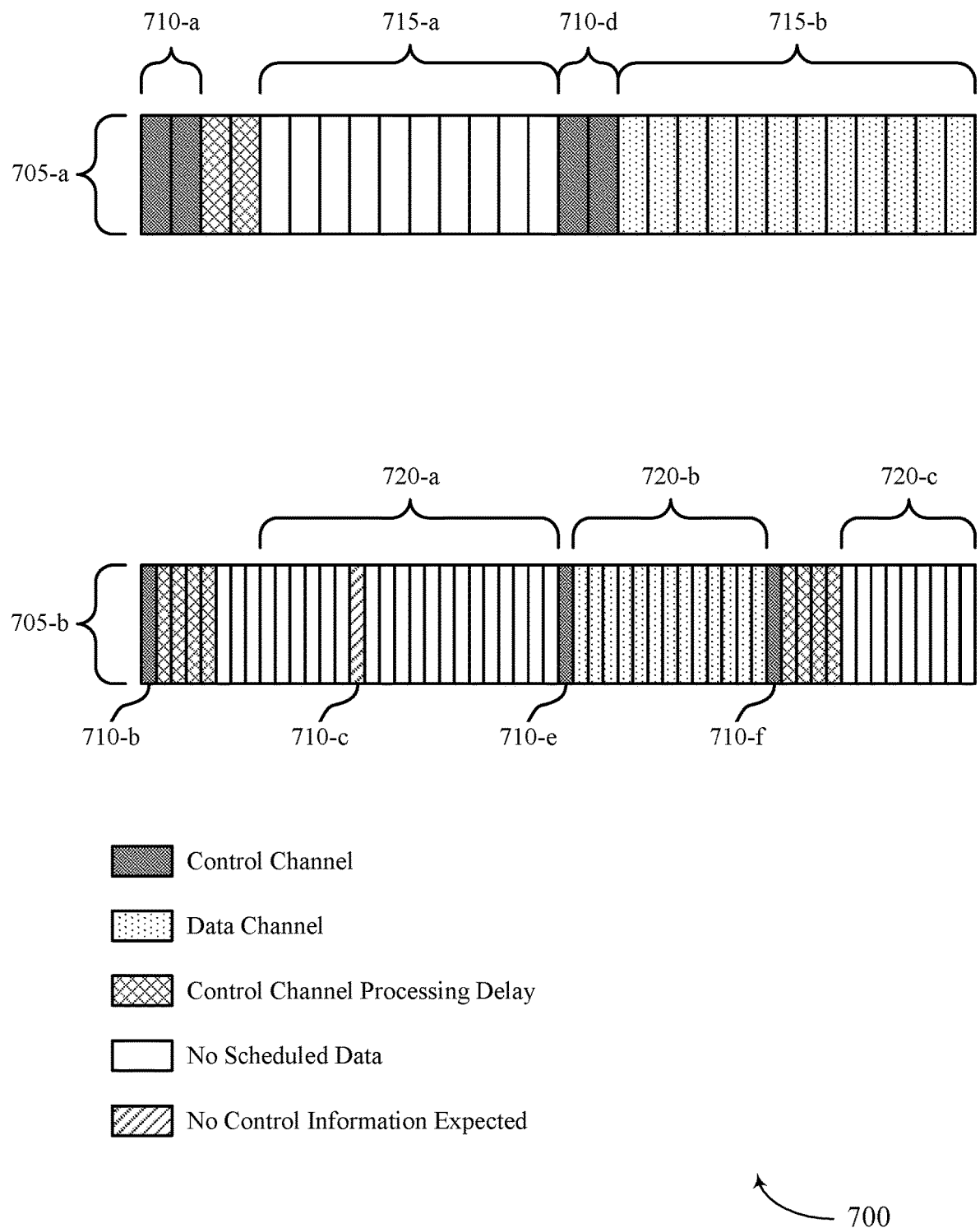
FIG. 7 illustrates an example of resources used for synchronized communications between a base station and a UE on multiple carriers associated with different numerologies in accordance with aspects of the present disclosure.

FIG. 7 illustrates an example of resources 700 used for synchronized communications between a base station 105 and a UE 115 on multiple carriers 705 associated with different numerologies in accordance with aspects of the present disclosure. In the example of FIG. 7, UE 115-*a* may be configured to communicate on a first carrier 705-*a* associated with one numerology (e.g., characterized by a subcarrier spacing of 15 kHz) and a second carrier 705-*b* associated with another numerology (e.g., characterized by a subcarrier spacing of 30 kHz) using a common RF chain, where the first carrier 705-*a* and the second carrier 705-*b* may be within a same frequency band (i.e., intra-band carrier aggregation). To maximize power savings at the UE 115-*a*, base station 105-*a* may use the techniques described herein to schedule UE 115-*a* for synchronized communications on the first carrier 705-*a* and the second carrier 705-*b*. That is, base station 105-*a* may group the first carrier 705-*a* and the second carrier 705-*b* for synchronized scheduling (e.g., based on an indication of preferred groups for synchronized scheduling received from UE 115-*a*).

Since carrier 705-*a* and carrier 705-*b* may be associated with different numerologies, the duration of time slots on these carriers may be different. For example, a slot on carrier 705-*a* may span two slots on carrier 705-*b*. Accordingly, it may be challenging for a base station 105-*a* to synchronize communications on the first carrier 705-*a* and the second carrier 705-*b*. As described herein, to allow the base station 105-*a* to efficiently synchronize communications on the first carrier 705-*a* and the second carrier 705-*b*, communications on the second carrier 705-*b* (i.e., the carrier associated with a shorter slot duration) may be scheduled based on communications on the first carrier 705-*a* (i.e., the carrier associated with a larger slot duration). That is, if a slot on the first carrier 705-*a* is scheduled for communications, an overlapping slot on the second carrier 705-*b* may also be scheduled. However, if a slot on the first carrier 705-*a* is unscheduled for communications, an overlapping slot on the second carrier 705-*b* may not be scheduled and control information may not be expected on the second carrier 705-*b* for the duration of the slot on the first carrier 705-*a*.

UE 115-*a* may receive an indication (e.g., in a first control channel 710-*a*) on the first carrier 705-*a* that the UE 115-*a* is unscheduled for communications on a set of symbols 715-*a*. Thus, UE 115-*a* may determine that the UE 115-*a* is also unscheduled for communications on a set of symbols 720-*a* on the second carrier 705-*b* (e.g., regardless of whether the DCI received in a second control channel 710-*b* indicates that the UE 115-*a* is scheduled or unscheduled on the set of symbols 720-*a*). Thus, UE 115-*a* may transition the common RF chain used to communicate on the first carrier 705-*a* and the second carrier 705-*b* to a sleep mode to save power, and UE 115-*a* may not expect to receive control information in a third control channel 710-*c*. UE 115-*a* may then receive an indication (e.g., in a fourth control channel 710-*d*) that the UE 115-*a* is scheduled to receive data in a set of symbol 715-*b* on the first carrier 705-*a*, and UE 115-*a* may receive another indication (e.g., in a fifth control channel 710-*e*) that the UE 115-*a* is scheduled to receive data in a set of symbols 720-*b* on the second carrier 705-*b*. Thus, UE 115-*a* may keep the common RF chain active to receive the data in the set of symbols 715-*b* on the first carrier 705-*a* and in the set of symbols 720-*b* on the second carrier 705-*b*. UE 115-*a* may then receive another indication (e.g., in a sixth control channel 710-*f*) on the second carrier 705-*b* that the UE 115-*a* is unscheduled for communications on a set of symbols 720-*c*. However, because the set of symbols 720-*c* on the second carrier may overlap with the set of symbols 715-*b* on the first carrier, UE 115-*a* may not be able to transition the common RF chain to a sleep mode during the set of symbols 720-*c*.

Figure 8:
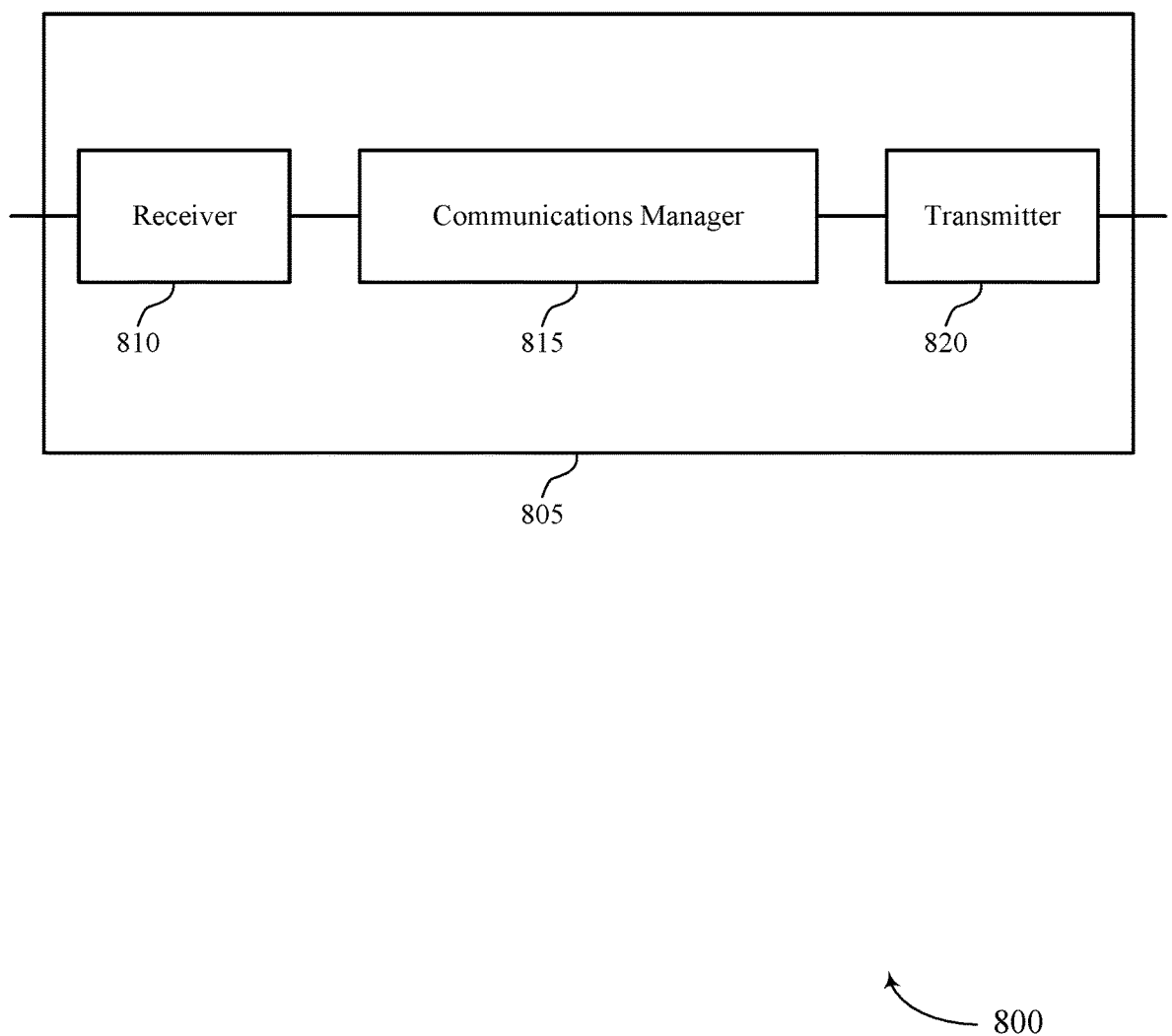
FIGS. 8 and 9 show block diagrams of devices that support synchronized scheduling for carrier aggregation in accordance with aspects of the present disclosure.

FIG. 8 shows a block diagram 800 of a device 805 that supports synchronized scheduling for carrier aggregation in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to synchronized scheduling for carrier aggregation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a carrier aggregation configuration message from a base station indicating a set of carriers configured for communications with the base station, group the set of carriers into one or more groups, wherein carriers in each of the one or more groups are to be scheduled for communications with the base station on at least partially overlapping time resources, and communicate with the base station based on the grouping. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its subcomponents may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages. One implementation may allow a UE supporting carrier aggregation to be efficiently scheduled for communications with a base station such that the UE may save power. In particular, the UE may use an RF chain to communicate on multiple carriers, and, in accordance with the techniques described herein, a base station may schedule the UE for communications such that the UE is unscheduled on all of the multiple carriers at the same time (e.g., intermittently). As such, the UE may power down the RF chain or transition the RF chain to a sleep mode and save power during these unscheduled periods. Further, a processor at the UE may be used to process uplink or downlink signals when the UE is scheduled for communications on the multiple carriers, and the processor may not be used to process communications on any of the multiple carriers when the UE is unscheduled on the multiple carriers.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
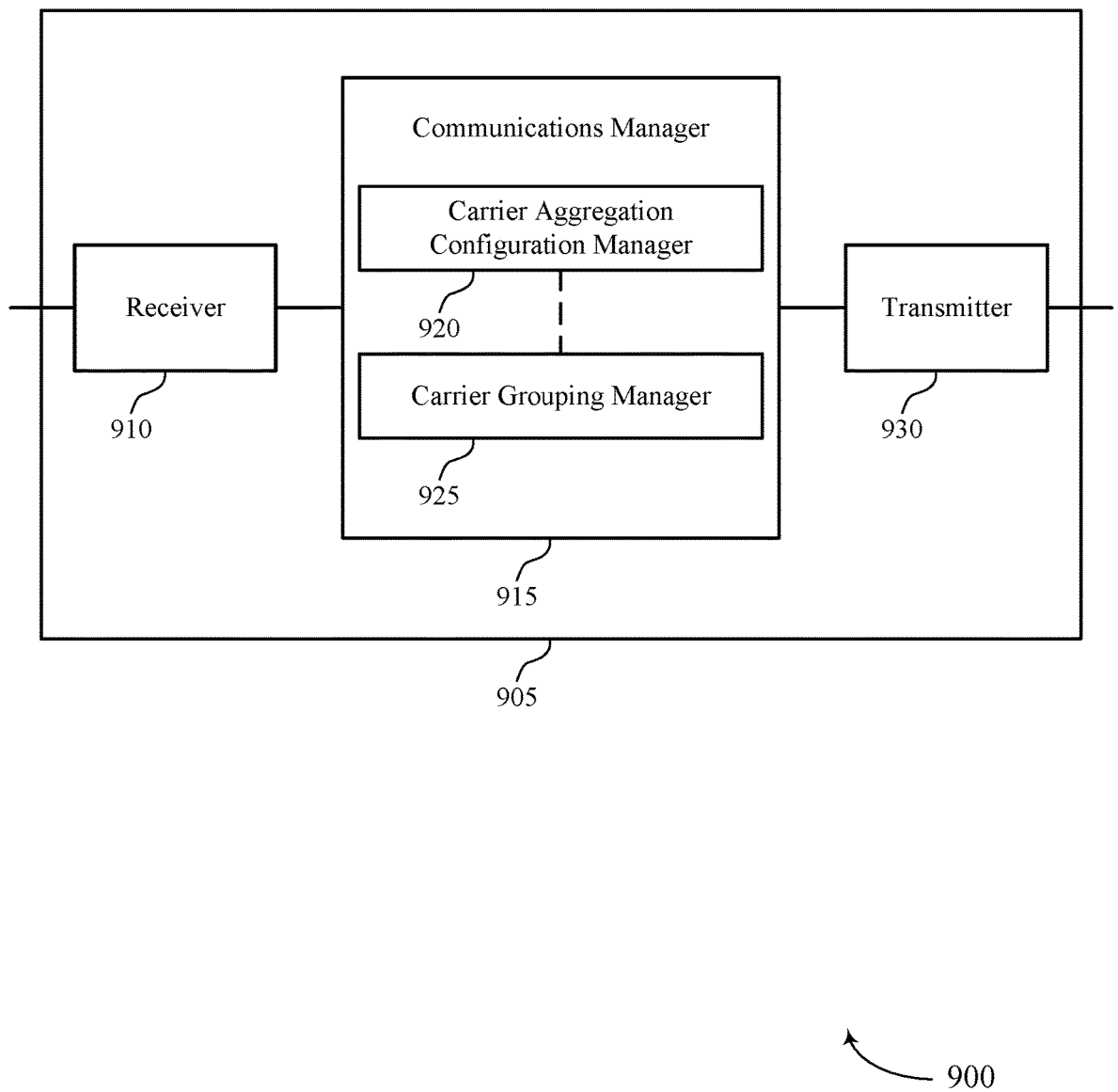

FIG. 9 shows a block diagram 900 of a device 905 that supports synchronized scheduling for carrier aggregation in accordance with aspects of the present disclosure. The device 905 may be an example of aspects of a device 805, or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to synchronized scheduling for carrier aggregation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a carrier aggregation configuration manager 920 and a carrier grouping manager 925. The communications manager 915 may be an example of aspects of the communications manager 1110 described herein.

The carrier aggregation configuration manager 920 may receive a carrier aggregation configuration message from a base station indicating a set of carriers configured for communications with the base station. The carrier grouping manager 925 may group the set of carriers into one or more groups, wherein carriers in each of the one or more groups are to be scheduled for communications with the base station on at least partially overlapping time resources and communicate with the base station based on the grouping.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
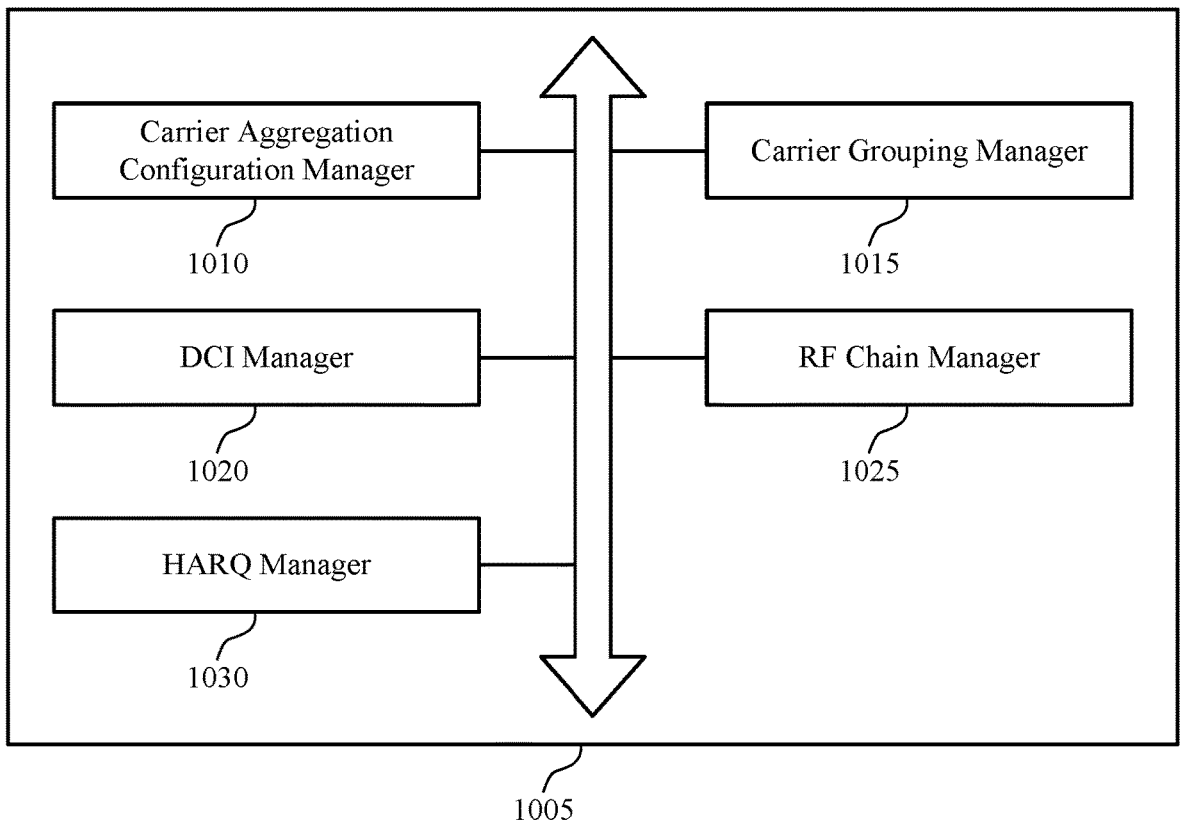
FIG. 10 shows a block diagram of a communications manager that supports synchronized scheduling for carrier aggregation in accordance with aspects of the present disclosure.

FIG. 10 shows a block diagram 1000 of a communications manager 1005 that supports synchronized scheduling for carrier aggregation in accordance with aspects of the present disclosure. The communications manager 1005 may be an example of aspects of a communications manager 815, a communications manager 915, or a communications manager 1110 described herein. The communications manager 1005 may include a carrier aggregation configuration manager 1010, a carrier grouping manager 1015, a DCI manager 1020, a RF chain manager 1025, and a HARQ manager 1030. Each of these modules may communicate, directly or indirectly, with one another (e.g., via one or more buses).

The carrier aggregation configuration manager 1010 may receive a carrier aggregation configuration message from a base station indicating a set of carriers configured for communications with the base station. In some cases, the set of carriers are within a same frequency band. The carrier grouping manager 1015 may group the set of carriers into one or more groups, wherein carriers in each of the one or more groups are to be scheduled for communications with the base station on at least partially overlapping time resources. In some examples, the carrier grouping manager 1015 may transmit an indication to the base station of one or more preferred groups of the set of carriers. The HARQ manager 1030 may receive feedback from the base station indicating whether the base station successfully received the indication. In some cases, the indication is transmitted in RRC signaling. In some examples, the carrier grouping manager 1015 may receive an indication of the one or more groups of the set of carriers, the one or more groups being determined based on the one or more preferred groups and representing actual groupings of carriers that are to be scheduled for communications with the base station on at least partially overlapping time resources.

In some examples, communications in a time slot on a first carrier associated with a first numerology are scheduled based on communications scheduled in the time slot on a second carrier associated with a second numerology, the second numerology being associated with a larger time slot duration than the first numerology. In some cases, a group of the one or more groups includes carriers associated with a same numerology. In some cases, a group of the one or more groups includes at least two carriers associated with different numerologies.

The DCI manager 1020 may receive DCI for carriers within a group of the one or more groups, the DCI indicating that none of the carriers within the group include downlink data for the UE in a time slot. The RF chain manager 1025 may transition a radio frequency chain of the UE and associated with the preferred group to a sleep mode until at least an end of the time slot. In some examples, the DCI manager 1020 may fail to receive DCI that schedules a transmission in a time slot on carriers within a group of the one or more groups. The RF chain manager 1025 may transition a radio frequency chain of the UE and associated with the group to a sleep mode until at least an end of the time slot based on failing to receive the DCI. In some examples, the DCI manager 1020 may receive DCI for carriers within a group of the one or more groups, the DCI for a carrier being within a first time slot and scheduling communications in the first time slot or in a later time slot.

Figure 11:
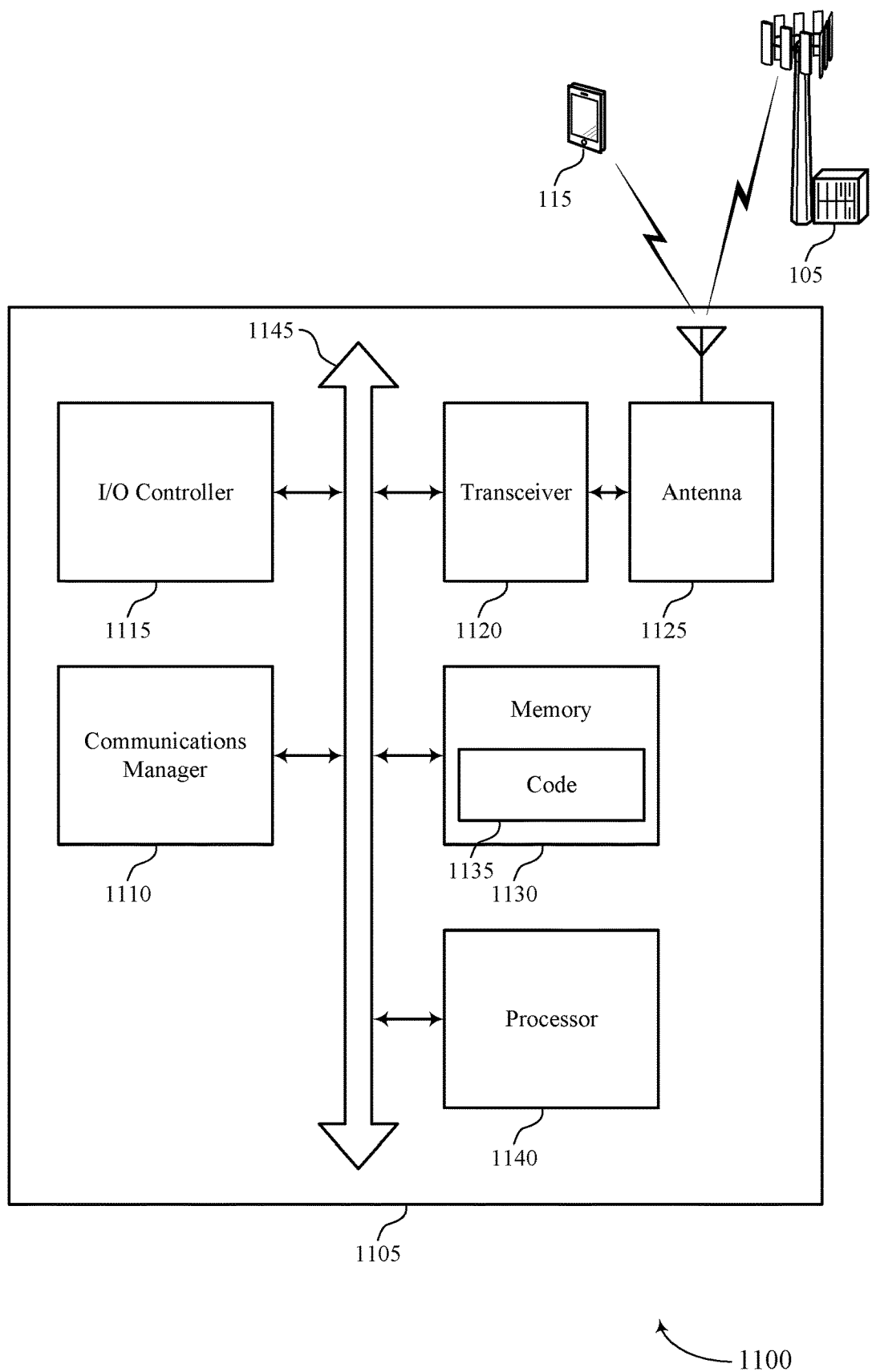
FIG. 11 shows a diagram of a system including a device that supports synchronized scheduling for carrier aggregation in accordance with aspects of the present disclosure.

FIG. 11 shows a diagram of a system 1100 including a device 1105 that supports synchronized scheduling for carrier aggregation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a carrier aggregation configuration message from a base station indicating a set of carriers configured for communications with the base station, group the set of carriers into one or more preferred groups, the one or more preferred groups representing a recommendation that carriers within a preferred group are to be scheduled for communications with the base station on at least partially overlapping time resources, and transmit an indication to the base station of the one or more preferred groups of the set of carriers.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a binary input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting synchronized scheduling for carrier aggregation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
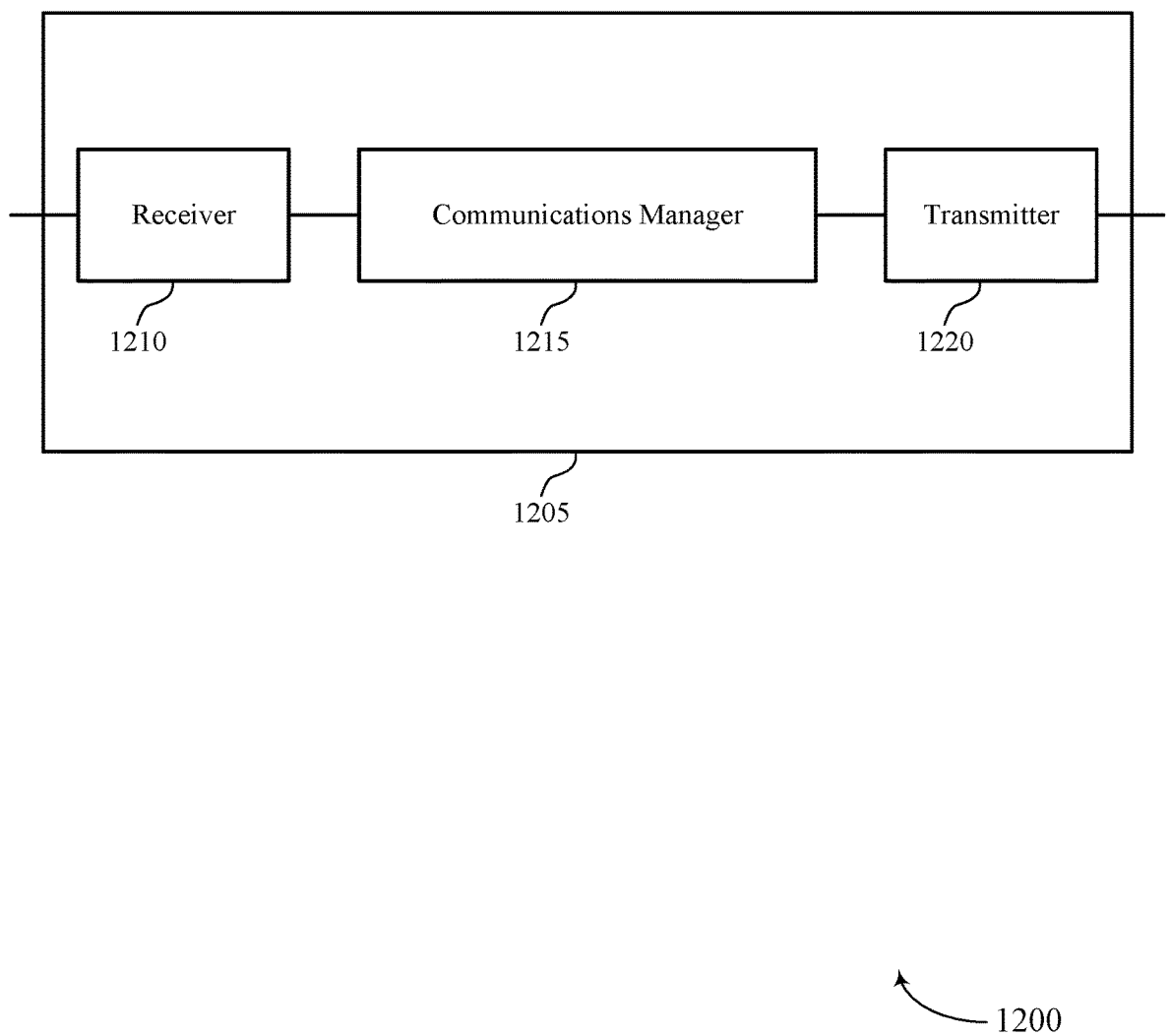
FIGS. 12 and 13 show block diagrams of devices that support synchronized scheduling for carrier aggregation in accordance with aspects of the present disclosure.

FIG. 12 shows a block diagram 1200 of a device 1205 that supports synchronized scheduling for carrier aggregation in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to synchronized scheduling for carrier aggregation, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a carrier aggregation configuration message to a UE indicating a set of carriers configured for communications with the UE, group the set of carriers into one or more groups, the one or more groups representing groupings of carriers that are to be scheduled for communications with the UE on at least partially overlapping time resources, and schedule communications with the UE on the set of carriers based on the grouping. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
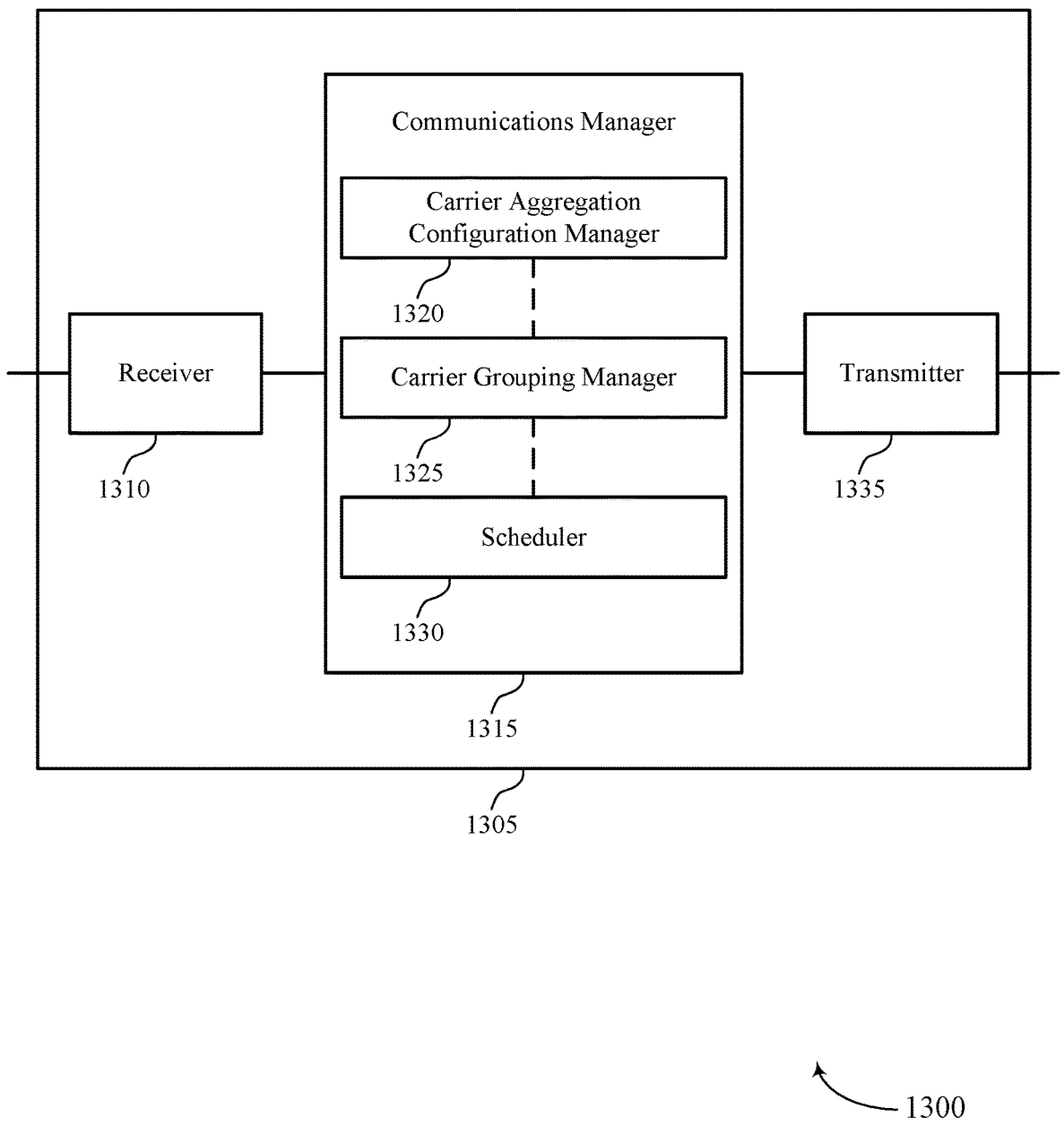

FIG. 13 shows a block diagram 1300 of a device 1305 that supports synchronized scheduling for carrier aggregation in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to synchronized scheduling for carrier aggregation, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a carrier aggregation configuration manager 1320, a carrier grouping manager 1325, and a scheduler 1330. The communications manager 1315 may be an example of aspects of the communications manager 1510 described herein.

The carrier aggregation configuration manager 1320 may transmit a carrier aggregation configuration message to a UE indicating a set of carriers configured for communications with the UE. The carrier grouping manager 1325 may group the set of carriers into one or more groups, the one or more groups representing groupings of carriers that are to be scheduled for communications with the UE on at least partially overlapping time resources. The scheduler 1330 may schedule communications with the UE on the set of carriers based on the grouping.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
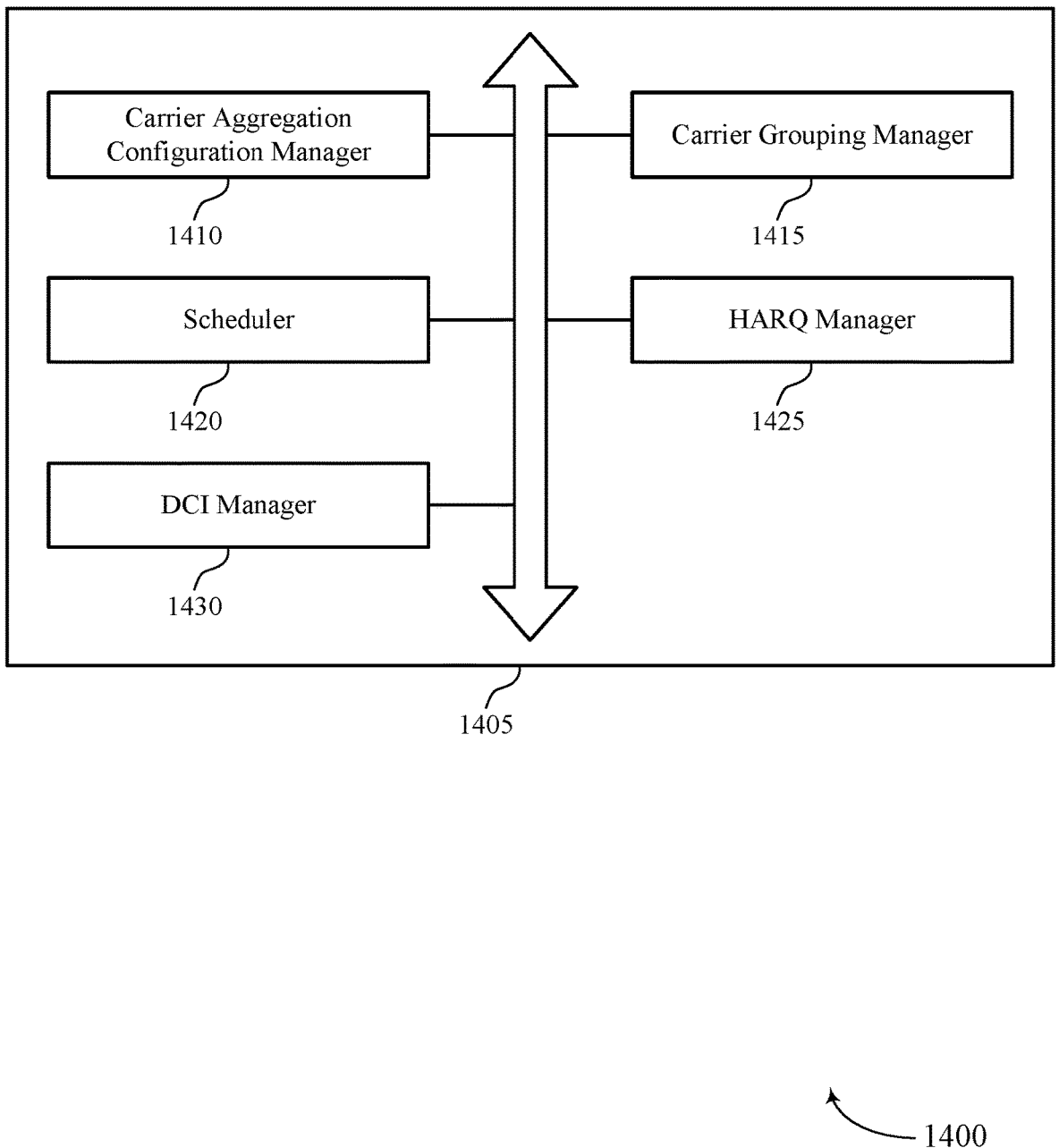
FIG. 14 shows a block diagram of a communications manager that supports synchronized scheduling for carrier aggregation in accordance with aspects of the present disclosure.

FIG. 14 shows a block diagram 1400 of a communications manager 1405 that supports synchronized scheduling for carrier aggregation in accordance with aspects of the present disclosure. The communications manager 1405 may be an example of aspects of a communications manager 1215, a communications manager 1315, or a communications manager 1510 described herein. The communications manager 1405 may include a carrier aggregation configuration manager 1410, a carrier grouping manager 1415, a scheduler 1420, a HARQ manager 1425, and a DCI manager 1430. Each of these modules may communicate, directly or indirectly, with one another (e.g., via one or more buses).

The carrier aggregation configuration manager 1410 may transmit a carrier aggregation configuration message to a UE indicating a set of carriers configured for communications with the UE. In some cases, the set of carriers are within a same frequency band. The carrier grouping manager 1415 may group the set of carriers into one or more groups, the one or more groups representing groupings of carriers that are to be scheduled for communications with the UE on at least partially overlapping time resources. In some examples, the carrier grouping manager 1415 may receive an indication from the UE of one or more preferred groups of the set of carriers, the one or more preferred groups representing a recommendation that carriers within a preferred group are to be scheduled for communications with the UE on at least partially overlapping resources.

In some examples, the carrier grouping manager 1415 may group the set of carriers into the one or more groups based on the one or more preferred groups. In some cases, the indication is received in RRC signaling. In some cases, a group of the one or more groups includes carriers associated with a same numerology. In some cases, a group of the one or more groups includes at least two carriers associated with different numerologies. The scheduler 1420 may schedule communications with the UE on the set of carriers based on the grouping. In some examples, the scheduler 1420 may schedule communications in a time slot on a first carrier associated with a first numerology based on communications scheduled in the time slot on a second carrier associated with a second numerology, the second numerology being associated with a larger slot duration than the first numerology.

The HARQ manager 1425 may transmit feedback to the UE indicating whether the base station successfully received the indication. The DCI manager 1430 may transmit DCI for carriers within a group, the DCI indicating whether downlink data is included in a time slot for the UE on a respective carrier. In some cases, the DCI for a carrier is within a first time slot and schedules communications in the first time slot or in a later time slot.

Figure 15:
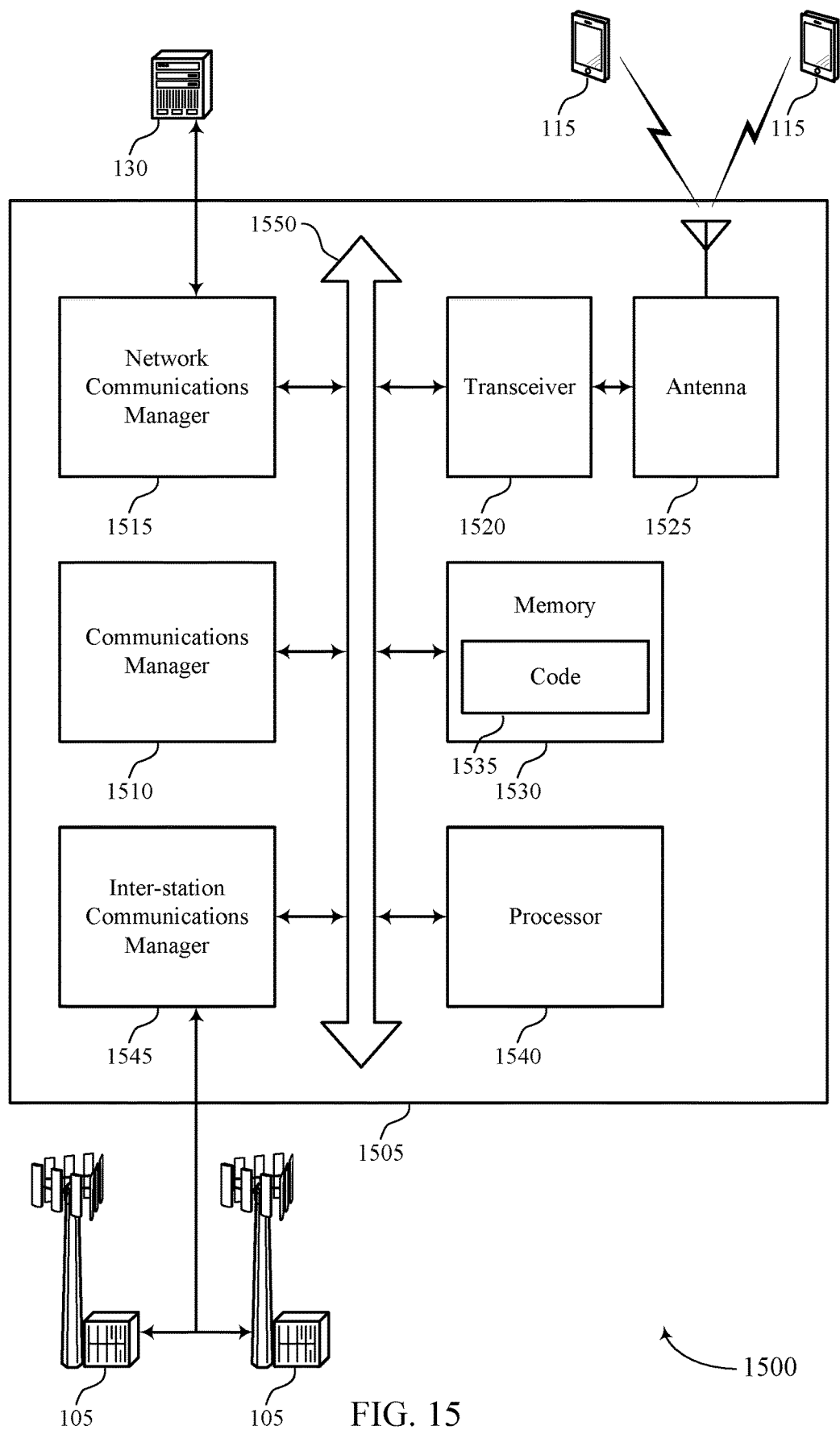
FIG. 15 shows a diagram of a system including a device that supports synchronized scheduling for carrier aggregation in accordance with aspects of the present disclosure.

FIG. 15 shows a diagram of a system 1500 including a device 1505 that supports synchronized scheduling for carrier aggregation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a carrier aggregation configuration message to a UE indicating a set of carriers configured for communications with the UE, group the set of carriers into one or more groups, the one or more groups representing groupings of carriers that are to be scheduled for communications with the UE on at least partially overlapping time resources, and schedule communications with the UE on the set of carriers based on the grouping.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting synchronized scheduling for carrier aggregation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
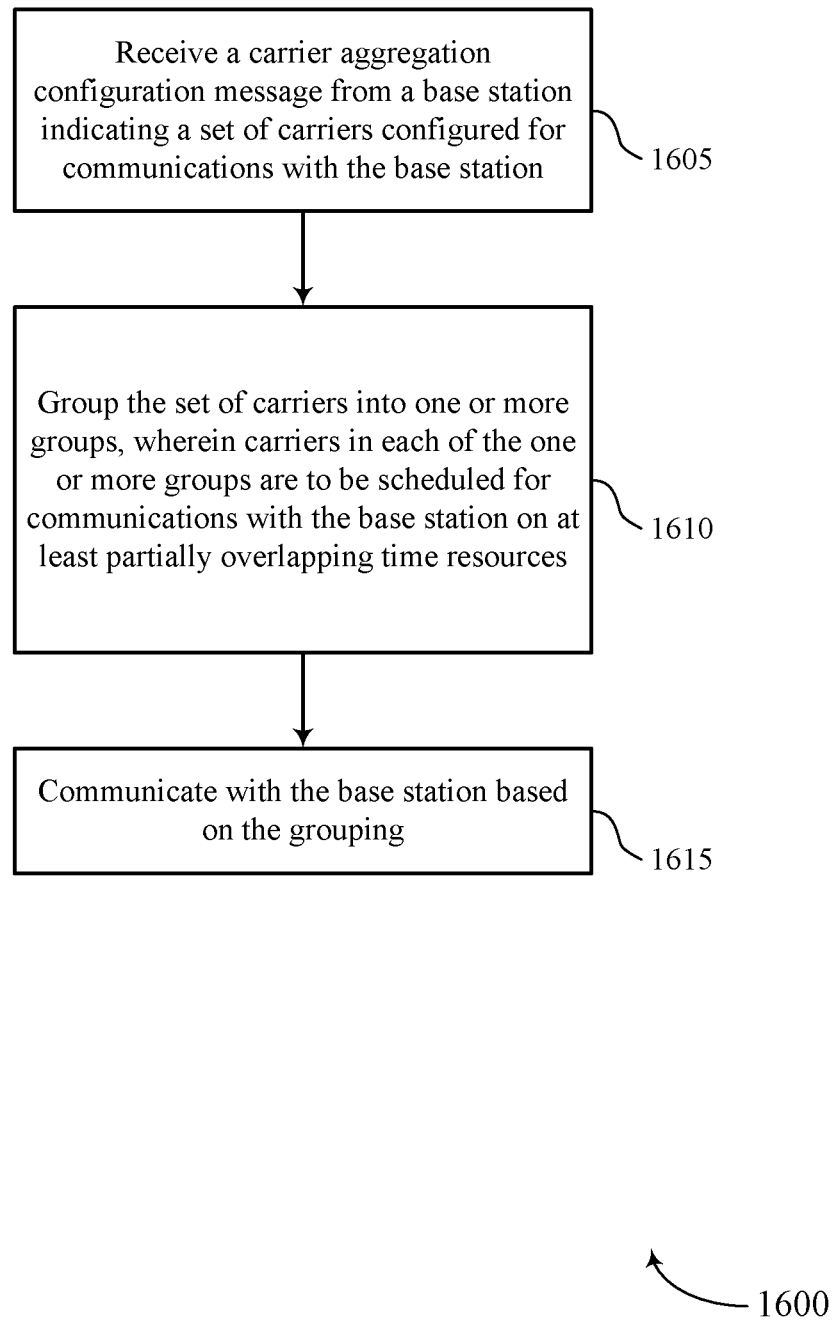
FIGS. 16 and 17 show flowcharts illustrating methods that support synchronized scheduling for carrier aggregation in accordance with aspects of the present disclosure.

FIG. 16 shows a flowchart illustrating a method 1600 that supports synchronized scheduling for carrier aggregation in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may receive a carrier aggregation configuration message from a base station indicating a set of carriers configured for communications with the base station. The operations of 1605 may be performed according to the methods described herein. In some examples, aspects of the operations of 1605 may be performed by a carrier aggregation configuration manager as described with reference to FIGS. 8 through 11.

At 1610, the UE may group the set of carriers into one or more groups, wherein carriers in each of the one or more groups are to be scheduled for communications with the base station on at least partially overlapping time resources. The operations of 1610 may be performed according to the methods described herein. In some examples, aspects of the operations of 1610 may be performed by a carrier grouping manager as described with reference to FIGS. 8 through 11.

At 1615, the UE may communicate with the base station based on the grouping. The operations of 1615 may be performed according to the methods described herein. In some examples, aspects of the operations of 1615 may be performed by a carrier aggregation configuration manager as described with reference to FIGS. 8 through 11.

Figure 17:
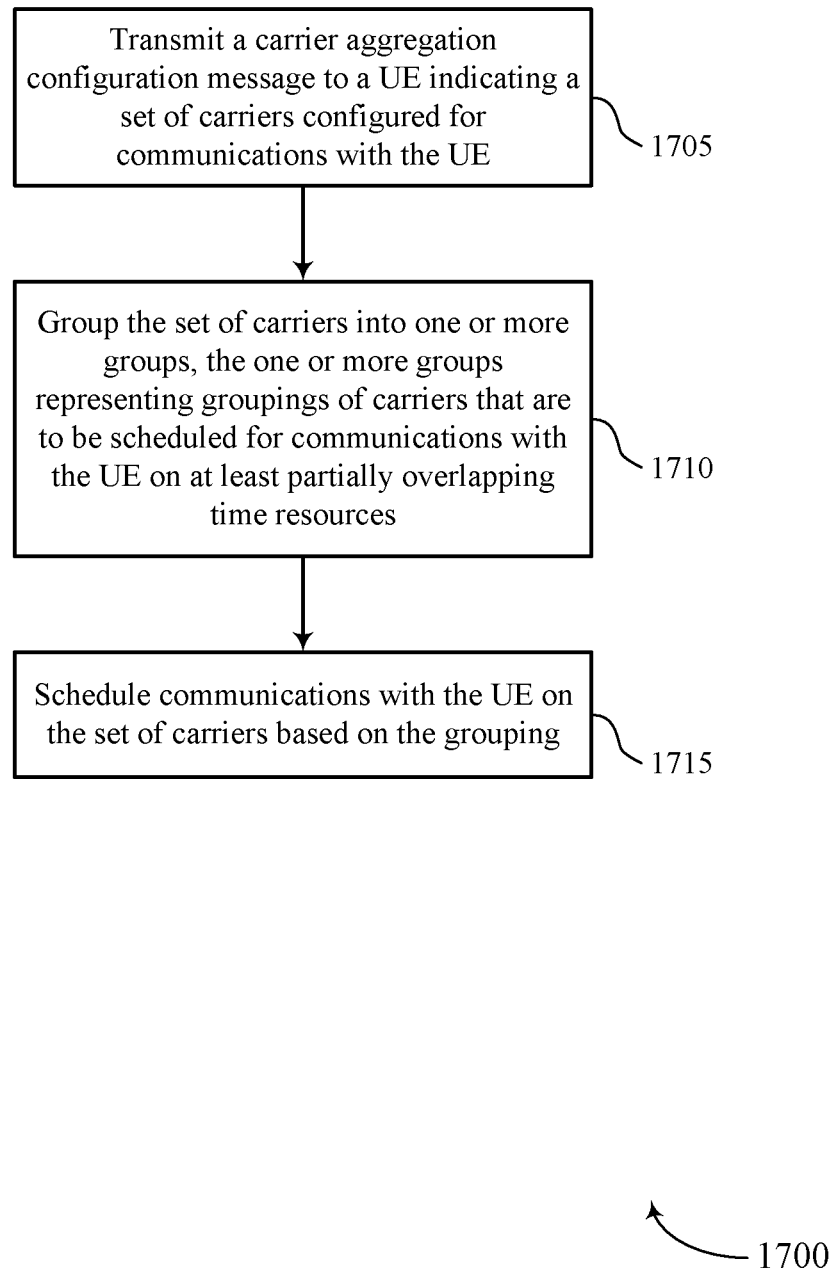

FIG. 17 shows a flowchart illustrating a method 1700 that supports synchronized scheduling for carrier aggregation in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may transmit a carrier aggregation configuration message to a UE indicating a set of carriers configured for communications with the UE. The operations of 1705 may be performed according to the methods described herein. In some examples, aspects of the operations of 1705 may be performed by a carrier aggregation configuration manager as described with reference to FIGS. 12 through 15.

At 1710, the base station may group the set of carriers into one or more groups, the one or more groups representing groupings of carriers that are to be scheduled for communications with the UE on at least partially overlapping time resources. The operations of 1710 may be performed according to the methods described herein. In some examples, aspects of the operations of 1710 may be performed by a carrier grouping manager as described with reference to FIGS. 12 through 15.

At 1715, the base station may schedule communications with the UE on the set of carriers based on the grouping. The operations of 1715 may be performed according to the methods described herein. In some examples, aspects of the operations of 1715 may be performed by a scheduler as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a carrier aggregation configuration message from a base station indicating a plurality of carriers configured for communications with the base station;
    grouping the plurality of carriers into one or more groups, wherein carriers in each of the one or more groups are to be scheduled for communications with the base station on at least partially overlapping time resources;
    communicating with the base station based at least in part on the grouping;
    receiving downlink control information (DCI) for carriers within a group of the one or more groups, the DCI indicating that none of the carriers within the group include downlink data for the UE in a time slot; and
    transitioning a radio frequency chain of the UE and associated with the group to a sleep mode until at least an end of the time slot.

2. The method of claim 1, wherein the carrier aggregation configuration message comprises an indication of the one or more groups of the plurality of carriers, and the grouping is based at least in part on the indication of the one or more groups of the plurality of carriers.

3. The method of claim 1, further comprising:
    transmitting an indication to the base station of one or more preferred groups of the plurality of carriers.

4. The method of claim 3, further comprising:
    receiving an indication of the one or more groups of the plurality of carriers, the one or more groups being determined by the base station based at least in part on the one or more preferred groups and representing actual groupings of carriers that are to be scheduled for communications with the base station on at least partially overlapping time resources.

5. The method of claim 3, further comprising:
    receiving feedback from the base station indicating whether the base station successfully received the indication.

6. The method of claim 3, wherein the indication is transmitted in radio resource control (RRC) signaling.

7. The method of claim 1, wherein a group of the one or more groups comprises carriers associated with a same numerology.

8. The method of claim 1, wherein a group of the one or more groups comprises at least two carriers associated with different numerologies.

9. The method of claim 8, wherein:
    communications in a time slot on a first carrier associated with a first numerology are scheduled based at least in part on communications scheduled in the time slot on a second carrier associated with a second numerology, the second numerology being associated with a larger time slot duration than the first numerology.

10. The method of claim 1, wherein the plurality of carriers are within a same frequency band.

11. A method for wireless communication at a base station, comprising:
    transmitting a carrier aggregation configuration message to a user equipment (UE) indicating a plurality of carriers configured for communications with the UE;
    grouping the plurality of carriers into one or more groups, the one or more groups representing groupings of carriers that are to be scheduled for communications with the UE on at least partially overlapping time resources;
    scheduling communications with the UE on the plurality of carriers based at least in part on the grouping; and
    receiving, from the UE, an indication of one or more preferred groups of the plurality of carriers, the one or more preferred groups representing a recommendation that carriers within a preferred group are to be scheduled for communications with the UE on at least partially overlapping resources, wherein:

the plurality of carriers are grouped into the one or more groups based at least in part on the one or more preferred groups.

12. The method of claim 11, further comprising:
transmitting feedback to the UE indicating whether the base station successfully received the indication.

13. The method of claim 11, wherein the indication is received in radio resource control (RRC) signaling.

14. The method of claim 11, wherein scheduling communications with the UE on the plurality of carriers comprises:
transmitting downlink control information (DCI) for carriers within a group, the DCI indicating whether downlink data is included in a time slot for the UE on a respective carrier.

15. The method of claim 14, wherein the DCI for a carrier is within a first time slot and schedules communications in the first time slot or in a later time slot.

16. The method of claim 11, wherein a group of the one or more groups comprises carriers associated with a same numerology.

17. The method of claim 11, wherein a group of the one or more groups comprises at least two carriers associated with different numerologies.

18. The method of claim 17, wherein scheduling communications with the UE on the plurality of carriers comprises:
scheduling communications in a time slot on a first carrier associated with a first numerology based at least in part on communications scheduled in the time slot on a second carrier associated with a second numerology, the second numerology being associated with a larger slot duration than the first numerology.

19. The method of claim 11, wherein the plurality of carriers are within a same frequency band.

20. An apparatus for wireless communication at a user equipment (UE), comprising:
a processor,
memory in electronic communication with the processor; and
instructions stored in the memory and executable by the processor to cause the apparatus to:
receive a carrier aggregation configuration message from a base station indicating a plurality of carriers configured for communications with the base station;
group the plurality of carriers into one or more groups, wherein carriers in each of the one or more groups are to be scheduled for communications with the base station on at least partially overlapping time resources;
communicate with the base station based at least in part on the grouping;
receive downlink control information (DCI) for carriers within a group of the one or more groups, the DCI indicating that none of the carriers within the group include downlink data for the UE in a time slot; and
transition a radio frequency chain of the UE and associated with the group to a sleep mode until at least an end of the time slot.

21. The apparatus of claim 20, wherein the carrier aggregation configuration message comprises an indication of the one or more groups of the plurality of carriers, and the grouping is based at least in part on the indication of the one or more groups of the plurality of carriers.

22. The apparatus of claim 20, wherein the instructions are further executable by the processor to cause the apparatus to:
transmit an indication to the base station of one or more preferred groups of the plurality of carriers.

23. The apparatus of claim 20, wherein the instructions are further executable by the processor to cause the apparatus to:
receive an indication of the one or more groups of the plurality of carriers, the one or more groups being determined by the base station based at least in part on the one or more preferred groups and representing actual groupings of carriers that are to be scheduled for communications with the base station on at least partially overlapping time resources.

24. A method for wireless communication at a user equipment (UE), comprising:
receiving a carrier aggregation configuration message from a base station indicating a plurality of carriers configured for communications with the base station;
grouping the plurality of carriers into one or more groups, wherein carriers in each of the one or more groups are to be scheduled for communications with the base station on at least partially overlapping time resources;
communicating with the base station based at least in part on the grouping; and
failing to receive downlink control information (DCI) that schedules a transmission in a time slot on carriers within a group of the one or more groups; and
transitioning a radio frequency chain of the UE and associated with the group to a sleep mode until at least an end of the time slot based at least in part on failing to receive the DCI.

25. The method of claim 24, wherein, at least one of:
the carrier aggregation configuration message comprises an indication of the one or more groups of the plurality of carriers, and the grouping is based at least in part on the indication of the one or more groups of the plurality of carriers; or
the plurality of carriers are within a same frequency band.

26. The method of claim 24, further comprising:
transmitting an indication to the base station of one or more preferred groups of the plurality of carriers.

27. The method of claim 26, further comprising, at least one of:
receiving an indication of the one or more groups of the plurality of carriers, the one or more groups being determined by the base station based at least in part on the one or more preferred groups and representing actual groupings of carriers that are to be scheduled for communications with the base station on at least partially overlapping time resources; or
receiving feedback from the base station indicating whether the base station successfully received the indication.

28. The method of claim 26, wherein the indication is transmitted in radio resource control (RRC) signaling.

29. The method of claim 24, wherein:
a group of the one or more groups comprises carriers associated with a same numerology; or
a group of the one or more groups comprises at least two carriers associated with different numerologies.

30. The method of claim 29, wherein:
communications in a time slot on a first carrier associated with a first numerology are scheduled based at least in part on communications scheduled in the time slot on a second carrier associated with a second numerology, the second numerology being associated with a larger time slot duration than the first numerology.

\* \* \* \* \*